US009723192B1

(12) United States Patent
Sammons et al.

(10) Patent No.: US 9,723,192 B1
(45) Date of Patent: Aug. 1, 2017

(54) APPLICATION DEPENDENT VIDEO RECORDING DEVICE ARCHITECTURE

(71) Applicant: H4 Engineering, Inc., San Antonio, TX (US)

(72) Inventors: Alexander G. Sammons, San Antonio, TX (US); Christopher T. Boyle, San Antonio, TX (US); Scott K. Taylor, San Antonio, TX (US); Gordon Jason Glover, Corpus Christi, TX (US)

(73) Assignee: H4 Engineering, Inc., San Antonio, TX (US)

( * ) Notice: Subject to any disclaimer, the term of this patent is extended or adjusted under 35 U.S.C. 154(b) by 0 days.

(21) Appl. No.: 14/738,520

(22) Filed: Jun. 12, 2015

Related U.S. Application Data

(63) Continuation-in-part of application No. 13/784,536, filed on Mar. 4, 2013, now Pat. No. 9,313,394.

(60) Provisional application No. 61/745,346, filed on Dec. 21, 2012, provisional application No. 61/607,549, filed on Mar. 6, 2012, provisional application No. 61/606,981, filed on Mar. 5, 2012, provisional
(Continued)

(51) Int. Cl.
*G03B 17/08* (2006.01)
*H04N 5/232* (2006.01)
*H04N 5/225* (2006.01)

(52) U.S. Cl.
CPC ....... *H04N 5/23203* (2013.01); *H04N 5/2252* (2013.01); *H04N 5/23241* (2013.01)

(58) Field of Classification Search
USPC .......................................................... 396/25
See application file for complete search history.

(56) References Cited

U.S. PATENT DOCUMENTS

| 4,041,507 A | 8/1977 | Chan et al. |
| 4,153,357 A | 5/1979 | Winnacker et al. |

(Continued)

FOREIGN PATENT DOCUMENTS

| EP | 0660131 A | 6/1995 |
| EP | 1981278 A1 | 10/2008 |

(Continued)

OTHER PUBLICATIONS

Barwani et al., Vehicle Dynamics Lab GPS Tracking Camera Turret, web site, 2009, available at URL http://www.me.berkeley.edu/ME102B/Past_Proj/f09/17%20GPS%20Camera%20Turret%20Website/Home.html.

(Continued)

*Primary Examiner* — Rodney Fuller
(74) *Attorney, Agent, or Firm* — Volk & McElroy, LLP; Michael D. Volk, Jr.

(57) ABSTRACT

The video recording systems disclosed herein comprise recording devices built in a variety of system architectures depending on the type of intended use. The guiding principle of the system architectures is that an optimal recording device will have optics, sensor, control electronics, and communication capability designed for the purpose of use. User controls, as well as power sources may be separated from the optimal recording device. Different applications may demand a variety of accessories including camera mounts, automatic camera orientation capabilities, remote control devices, and remote power sources, all of which may be designed as use-specific devices and optimized for the purpose of use.

20 Claims, 16 Drawing Sheets

Related U.S. Application Data application No. 61/606,976, filed on Mar. 5, 2012, provisional application No. 61/606,975, filed on Mar. 5, 2012, provisional application No. 61/606,358, filed on Mar. 2, 2012.

(56) References Cited

U.S. PATENT DOCUMENTS

| | | |
|---|---|---|
| 4,683,729 A | 8/1987 | Rogers |
| 4,814,711 A | 3/1989 | Olsen et al. |
| 4,980,871 A | 12/1990 | Sieber et al. |
| 5,073,824 A | 12/1991 | Vertin |
| 5,363,297 A | 11/1994 | Larson et al. |
| 5,389,967 A * | 2/1995 | Kim .............. G01S 3/783 348/169 |
| 5,430,473 A | 7/1995 | Beecher, II et al. |
| 5,438,357 A | 8/1995 | McNelley |
| 5,457,370 A | 10/1995 | Edwards |
| 5,463,432 A | 10/1995 | Kahn |
| 5,491,632 A | 2/1996 | Pawlak et al. |
| 5,572,317 A | 11/1996 | Parker et al. |
| 5,640,007 A | 6/1997 | Talbott et al. |
| 5,668,629 A | 9/1997 | Parker et al. |
| 5,729,016 A * | 3/1998 | Klapper ............ B60R 1/00 250/332 |
| 5,764,786 A | 6/1998 | Kuwashima et al. |
| 5,802,412 A | 9/1998 | Kahn |
| 5,878,151 A | 3/1999 | Tang et al. |
| 5,912,980 A | 6/1999 | Hunke |
| 5,973,732 A | 10/1999 | Guthrie |
| 6,002,428 A | 12/1999 | Matsumura et al. |
| 6,014,167 A | 1/2000 | Suito et al. |
| 6,031,568 A | 2/2000 | Wakitani |
| 6,035,067 A | 3/2000 | Ponticos |
| 6,075,557 A | 6/2000 | Holliman et al. |
| 6,130,964 A | 10/2000 | Marques et al. |
| 6,147,701 A * | 11/2000 | Tamura ............ F16M 11/10 348/143 |
| 6,173,066 B1 | 1/2001 | Peurach et al. |
| 6,188,777 B1 | 2/2001 | Darrell et al. |
| 6,400,903 B1 * | 6/2002 | Conoval ........ H04N 5/23206 348/E5.043 |
| 6,519,860 B1 | 2/2003 | Bieg et al. |
| 6,560,029 B1 * | 5/2003 | Dobbie ............ G02B 23/125 2/6.1 |
| 6,596,976 B2 | 7/2003 | Lin et al. |
| 6,603,408 B1 | 8/2003 | Gaba |
| 6,650,360 B1 | 11/2003 | Osen |
| 6,690,978 B1 | 2/2004 | Kirsch |
| 6,744,403 B2 | 6/2004 | Milnes et al. |
| 6,751,409 B2 | 6/2004 | Nakamura |
| 6,771,213 B2 | 8/2004 | Durst et al. |
| 6,795,110 B1 | 9/2004 | Kossin |
| 6,867,799 B2 | 3/2005 | Broemmelsiek |
| 6,952,646 B2 | 10/2005 | Chang |
| 6,972,787 B1 | 12/2005 | Allen et al. |
| 7,050,712 B2 | 5/2006 | Shimamura |
| 7,060,921 B2 | 6/2006 | Kubo |
| 7,239,975 B2 | 7/2007 | Coleman et al. |
| 7,245,251 B2 | 7/2007 | Vogel et al. |
| 7,349,008 B2 | 3/2008 | Rui et al. |
| 7,365,771 B2 | 4/2008 | Kahn et al. |
| 7,426,338 B2 | 9/2008 | Matsumoto et al. |
| 7,450,835 B2 | 11/2008 | Lackey et al. |
| 7,477,839 B2 | 1/2009 | Funahashi et al. |
| 7,547,875 B1 | 6/2009 | Tsai et al. |
| 7,557,825 B2 | 7/2009 | Ishii et al. |
| 7,591,195 B2 | 9/2009 | Puzio |
| 7,672,781 B2 | 3/2010 | Churchill et al. |
| 7,751,696 B2 | 7/2010 | Tatamiya |
| 7,755,668 B1 * | 7/2010 | Johnston ............ H04N 5/2251 348/148 |
| 7,769,867 B2 * | 8/2010 | Fukuda ............ H04N 1/00137 348/231.9 |
| 7,855,638 B2 | 12/2010 | Huston |
| 9,071,740 B1 * | 6/2015 | Duffy ................ H04N 5/2252 |
| 2001/0030856 A1 | 10/2001 | Wilson |
| 2002/0005902 A1 | 1/2002 | Yuen |
| 2002/0057217 A1 | 5/2002 | Milnes et al. |
| 2002/0149681 A1 | 10/2002 | Kahn et al. |
| 2003/0025614 A1 | 2/2003 | Kahn |
| 2003/0118339 A1 * | 6/2003 | Yu .......................... G03B 17/56 396/428 |
| 2003/0214710 A1 | 11/2003 | Takahashi et al. |
| 2004/0006424 A1 | 1/2004 | Joyce et al. |
| 2004/0105010 A1 | 6/2004 | Osen |
| 2004/0119716 A1 | 6/2004 | Park et al. |
| 2004/0257464 A1 * | 12/2004 | Pandit .................. H04N 5/2251 348/373 |
| 2005/0014458 A1 | 1/2005 | Hung |
| 2005/0083433 A1 | 4/2005 | Wishart et al. |
| 2005/0134458 A1 | 6/2005 | Leyden et al. |
| 2005/0174084 A1 | 8/2005 | Nakai et al. |
| 2005/0201613 A1 | 9/2005 | Mostafavi |
| 2006/0045613 A1 | 3/2006 | Leyden et al. |
| 2006/0077258 A1 | 4/2006 | Allen et al. |
| 2007/0019073 A1 | 1/2007 | Comaniciu et al. |
| 2007/0146484 A1 | 6/2007 | Horton et al. |
| 2007/0164905 A1 | 7/2007 | Lempkowski et al. |
| 2007/0247615 A1 | 10/2007 | Bridges |
| 2007/0291123 A1 * | 12/2007 | Cole .................. H04N 7/181 348/207.11 |
| 2007/0292118 A1 | 12/2007 | Traff |
| 2008/0001022 A1 | 1/2008 | Sa et al. |
| 2008/0002031 A1 * | 1/2008 | Cana .................. G01S 5/0027 348/208.14 |
| 2008/0062711 A1 | 3/2008 | Veenstra et al. |
| 2008/0105527 A1 | 5/2008 | Leftly |
| 2008/0192116 A1 | 8/2008 | Tamir et al. |
| 2008/0225137 A1 | 9/2008 | Kubo et al. |
| 2008/0253140 A1 | 10/2008 | Fleischmann et al. |
| 2008/0271220 A1 | 11/2008 | Chilton et al. |
| 2009/0028386 A1 | 1/2009 | Michimoto et al. |
| 2009/0086043 A1 * | 4/2009 | Scheucher ............ H04N 7/183 348/211.4 |
| 2009/0096871 A1 | 4/2009 | Kuwano et al. |
| 2009/0145371 A1 | 6/2009 | Kramer |
| 2009/0154182 A1 | 6/2009 | Veenstra et al. |
| 2009/0167867 A1 | 7/2009 | Lin et al. |
| 2009/0267895 A1 | 10/2009 | Bunch |
| 2009/0300122 A1 | 12/2009 | Freer |
| 2010/0026809 A1 | 2/2010 | Curry |
| 2010/0030856 A1 | 2/2010 | Blum et al. |
| 2010/0118149 A1 | 5/2010 | Levin et al. |
| 2010/0149399 A1 | 6/2010 | Mukai et al. |
| 2010/0186214 A1 | 7/2010 | Judge |
| 2010/0191651 A1 | 7/2010 | Irmscher et al. |
| 2010/0238262 A1 | 9/2010 | Kurtz et al. |
| 2010/0245532 A1 | 9/2010 | Kurtz et al. |
| 2011/0050878 A1 | 3/2011 | Wells et al. |
| 2011/0090341 A1 | 4/2011 | Ikewada et al. |
| 2011/0109554 A1 | 5/2011 | Boissier |
| 2011/0163908 A1 | 7/2011 | Andersson et al. |
| 2011/0187865 A1 | 8/2011 | Felt et al. |
| 2011/0228098 A1 * | 9/2011 | Lamb .................. G01S 17/023 348/164 |
| 2011/0261176 A1 * | 10/2011 | Monaghan, Sr. ..... G02B 27/017 348/61 |
| 2012/0218415 A1 | 8/2012 | Chun et al. |
| 2012/0219271 A1 | 8/2012 | Vunic et al. |
| 2012/0262618 A1 | 10/2012 | Weakly |
| 2012/0269386 A1 | 10/2012 | Hankins et al. |
| 2013/0016960 A1 | 1/2013 | Yang |
| 2013/0077931 A1 | 3/2013 | Cornell et al. |
| 2013/0242080 A1 | 9/2013 | Kossin |
| 2013/0278845 A1 | 10/2013 | Pishnyak et al. |
| 2014/0055611 A1 * | 2/2014 | Wong .................. H04N 5/2251 348/143 |
| 2014/0152890 A1 | 6/2014 | Rayner |

(56) References Cited

U.S. PATENT DOCUMENTS

| | | | |
|---|---|---|---|
| 2014/0226062 A1 | 8/2014 | Parrill | |
| 2015/0077531 A1* | 3/2015 | Adair | H04N 5/3765 348/76 |
| 2015/0237312 A1* | 8/2015 | Reger | H04N 7/185 348/143 |

FOREIGN PATENT DOCUMENTS

| | | | |
|---|---|---|---|
| JP | 2002229672 A | 8/2002 | |
| JP | 2005020205 A | 1/2005 | |
| JP | 2005295222 A | 10/2005 | |
| JP | 2007312026 | 11/2007 | |
| JP | 2008288151 A | 11/2008 | |
| JP | 2010511111 A | 4/2010 | |
| JP | 2011124746 A | 6/2011 | |
| KR | 1019980043069 A | 8/1998 | |
| WO | 9517687 A | 6/1995 | |
| WO | 0141428 A1 | 6/2001 | |
| WO | 2008037127 A1 | 4/2008 | |
| WO | 2008067278 A1 | 6/2008 | |

OTHER PUBLICATIONS

Clifford et al., Measuring Tilt with Low-g Accelerometers, Freescale Semiconductor Application Note, May 2005, Freescale Semiconductor, available at URL http://classes.cecs.ucf.edu/seecsseniordesign/su2006fa2006/g09/files/patrick/measuring%20tilt%20with%20low-g%20accelerometers.pdf.

Dana M. Sommer, Principles of GPS , Presentation Slides, date of publication unknown, available at URL des.memphis.edu/esra/.../Principles%20of%20GPS%204-13-04.pdf, prior to Mar. 2, 2012.

E. Calais, The Global Positioning System, Presentation Slides, available at date of publication unknown, available at URL web.ics.purdue.edu/~ecalais/teaching/geodesy/GPS_observables.pdf, prior to Mar. 2, 2012.

Gibbings et al., Assessing the Accuracy and Integrity of RTK GPS Beneath High Voltage Power Lines, 2001—A Spatial Odyssey: 42nd Australian Surveyors Congress, date of publication unknown, available at URL eprints.usq.edu.au12606/1/gibbings.pdf, prior to Mar. 2, 2012.

Kaplan et al., Understanding GPS Principles and Applications, book, 2006, Artech House, available at URL http://www.bdu.ac.in/ckr/uploads/Earth/GPS%20FULL%20All%20in%201.pdf.

Kimberly Tuck, Tilt Sensing Using Linear Accelerometers, Freescale Semiconductor Application Note, Jun. 2007, Freescale Semiconductor, available at URL http://www.mh-hannover.de/fileadmin/zentrale_einrichtungen/zentrale_forschungswerkst/downloads/AN3461.pdf.

Oncore, Chapter 2 GPS Principles, date of publication unknown, available at URL gpsd.berlios.de/vendor-docs/motorola/ch2.pdf, prior to Mar. 2, 2012.

ECODRIVE03 Drive for General Automation With Fieldbus-Interface; 2000; Rexroth Indramat GmbH; pp. 224 and 278.

Dr. Jacob Tal, Motion Control Made Easy, PT Design, p. 62, 64 (Oct. 2000).

* cited by examiner

APPLICATION DEPENDENT VIDEO RECORDING DEVICE ARCHITECTURE

CROSS-REFERENCE TO RELATED APPLICATIONS

This application is a continuation-in-part of U.S. Nonprovisional patent application Ser. No. 13/784,536, filed Mar. 4, 2013, titled "Multifunction Automatic Video Recording Device", which application claims the benefit of U.S. Provisional Patent Application No. 61/606,358, filed Mar. 2, 2012, titled "Waterproof Electronic Device"; U.S. Provisional Patent Application No. 61/606,975, filed Mar. 5, 2012, titled "Automated Video Recording System"; U.S. Provisional Patent Application No. 61/606,976, filed Mar. 5, 2012, titled "Zoom Control for Automated Video Recording"; U.S. Provisional Patent Application No. 61/606,981, filed Mar. 5, 2012, titled "Apparatus and Method for Mounting a Camera for Automated Video Recording"; U.S. Provisional Patent Application No. 61/607,549, filed Mar. 6, 2012, titled "Sound In Automated Video Recording"; and U.S. Provisional Patent Application No. 61/745,346, filed Dec. 21, 2012, titled "Self-Recording Systems"; the contents of all of which are hereby incorporated by reference in their entirety and are not admitted to be prior art with respect to the present invention by the mention in this cross-reference section.

BACKGROUND

Recording a person participating in an activity is an important task. A surfer may wish to capture his or her surfing experience for later enjoyment or to improve his or her surfing technique. A father may wish to record his son's winning touchdown in a football game. A mother may wish to capture her daughter's record-breaking gymnastics performance. In these examples, the alternative to hiring an expensive cameraman or accepting amateur recordings, the proven solution is to use automatic or robotic cameras that are moved by an appropriate mechanism to keep the user in the video frame. An alternative to recording activities from a spectator's vantage point is using point of view (POV) action cameras to record the experience of the person engaged in the activity. In this case, the camera is typically attached to the person engaged in the activity or to an accessory used in the activity, like a skateboard, for example. In both cases it is desirable to provide cameras that are capable of fulfilling the task of recording and auxiliary equipment (like tripods, camera mounts, and the like) to aid the cameras and users to obtain the best possible footage. A lot of effort has been directed toward achieving these goals but a major problem remains in that the cameras and the accessories still lack the flexibility to provide the users with hardware suitable for the widest variety of conceivable filming circumstances.

SUMMARY OF THE INVENTION

For an automated cameraman and for point-of-view ("POV") cameras, the architecture of the recording apparatus is provided to give a user the best performance under a large variety of specific conditions that are characteristic of specific recording objectives and activity types. Such specific conditions include, for example, whether the recording apparatus is part of a system comprising a multiplicity of similar apparatuses; whether the automated cameraman is operated in a cooperative tracking mode, and, if so, what kind of signal is received from the remote unit associated with the subject of recording; whether the subject is the operator of the recording system, and, if so, whether it is feasible that human controls are at the subject's disposal at all times; whether a POV camera is attached to the person involved in the activity or to a sporting device used in the activity; etc.

A digital camera as a recording device comprises optics to project images on a sensor that converts the images into electronic information, storage devices to store at least some of the information, means to process information, means to transmit the electronic information corresponding to captured images to devices that enable viewing the images, device controls, a power source, and user interfaces. The control device is like a CPU or central processing unit including peripheries and firmware, excluding a user interface (i.e., like a computer without a keyboard, mouse, and screen, but having the interfaces to control other hardware (e.g., a camera, positioner) and to communicate with the outside world (via the Internet or "cloud", for example)).

In the case of automated video recording there are additional system elements provided, such as a pan/tilt positioner for orienting the camera, a tripod or similar device to hold the camera, and a control device (which may also referred to as a base station) that controls the positioner. Further, the control device may also be used for communicating with the user and with the outside world (e.g., via a network such as the Internet). In the case of POV cameras additional system elements comprise means to fasten the camera to the user's body or equipment. There may be additional elements that help to control the camera or help to connect the camera to the outside world (e.g., via a network such as the Internet).

The invention described herein comprises unconventional system architectures that can be thought of as a modular architecture that, for example, may integrate some elements of the recording systems with other system elements and separate some elements from other elements of the recording system according to the needs presented by specific applications and uses of both automated cameraman and POV recording systems.

If the capturing device in the recording system may be a modern digital camera, it comprises user interfaces for control and electrical batteries to provide operational power. However, the capturing device may be separated from the user control interfaces and from the power source if it is advantageous to place those at a location where the controls are more accessible for the user and/or where the weight of the batteries does not interfere with the activity to be recorded.

If the capturing device is an automated recording system (also referred to herein as an automated cameraman) comprising one or more digital cameras, the cameras and their controls may be integrated with positioners that orient each camera. Further, the camera or cameras may be integrated with a control unit (also called base station). If the system comprises a remote device or devices associated with the subject or subjects of the recording, these may incorporate system and camera controls.

DETAILED DESCRIPTION

Figure 1:
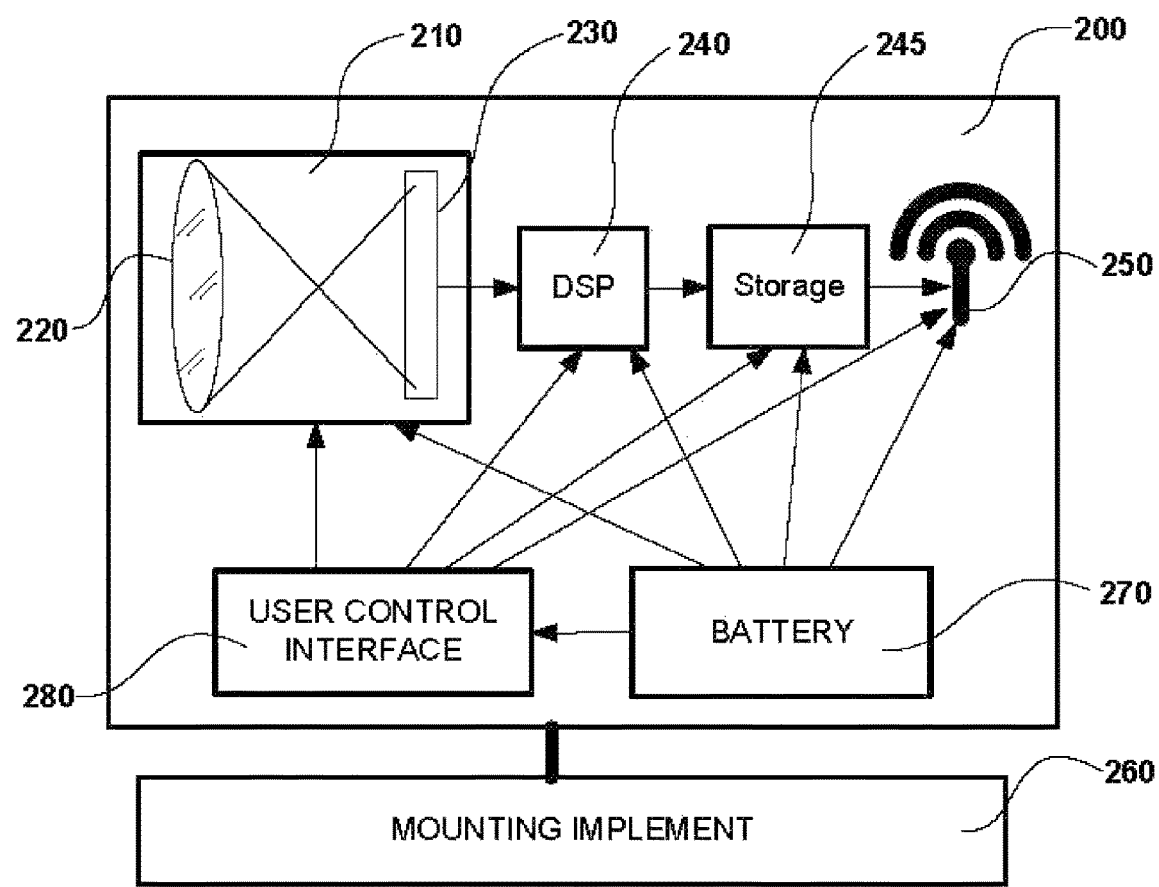
FIG. 1 shows a schematic diagram of the major components of a conventional digital camera.

Systems and methods of obtaining and utilizing location data for controlling a camera to track a subject have been described in co-owned U.S. Pat. No. 8,704,904, titled "Portable High Quality Automated Video Recording System", issued Apr. 22, 2014, and co-owned and co-pending U.S. Nonprovisional patent application Ser. No. 13/726,222, titled "System and Method for Initial Setup of an Automatic Recording System", filed Dec. 24, 2012; U.S. patent application Ser. No. 13/726,355, titled "Automatic Orientation of a Pointing Device Using a Single Global Positioning Unit", filed Dec. 24, 2012; U.S. Nonprovisional patent application Ser. No. 13/726,451, titled "Feedback and Manual Remote Control System and Method for Automatic Video Recording", filed Dec. 24, 2012; U.S. patent application Ser. No. 13/726,380, titled "A Portable System for Automated Video Recording", filed Dec. 24, 2012; and U.S. patent application Ser. No. 14/223,803 titled "Portable High Quality Automated Video Recording System", filed Mar. 24, 2014 (referred to herein as the "'803 Application"); the contents of all of which are hereby incorporated by reference herein in their entirety.

The present invention relates to video recording systems for recording activities, such as, for example, sports, recreation, or adventures. Some of these systems are automated and track the movements of one or more subjects (or targets) and record the activity without the aid of a cameraman. The location information needed for the orientation of a camera may be determined by a variety of methods that may be used individually or in various combinations; such methods will be collectively referred to herein as location determination technology (LDT). According to the present invention, camera orientations (and in some cases also additional camera movements) and camera settings are based on target size data and movement data regarding the camera and the filmed target. Movement data comprise location data supplemented by the time derivatives of location data (e.g., the target's velocity and acceleration). Also, the knowledge that location data are missing or are insufficiently well defined is treated as additional data. Other recording devices may be attached to or carried by the subject or may be attached to or carried by accessories that are related to the subject's activity. Such accessories may be wearable (e.g., helmets or armbands) or may be personal equipment (e.g., skateboards or skis), but may also be vehicles that are used or controlled by the user engaged in the activity.

One problem that the invention herein solves relates to the limitations caused by designing cameras as all-purpose, stand-alone devices. Whether it is a camera for a drone, an action camera, a robot camera, a handheld camera, or a stationary wide angle camera, each camera's power, user interface, and mounting requirements are dictated by the purpose of use or the type of activity and by the desired video quality. Cameras and camera accessories currently on the market do not take into account the fact that all of the design requirements, including user interface requirements and power requirements, are dictated by a very wide variety of applications and activities for which cameras are used.

A product like an action camera is designed to have a specific battery, specific user interface, lens size, sensor size, etc. Such an action camera is limited to certain activities because of these specifications, and most particularly by the size of the camera. If such an action camera is optimized for a particular application, it will be suboptimal for other applications. Consider, for example, a camera mounted on a helmet. With reference to the present invention, the action camera would be much better for many activities if such cameras were designed so that only the lens system, the image sensor, the digital signal processor (DSP), and the Wi-Fi antenna were included in the camera (or camera module) that is on the helmet, with the battery and user interface located elsewhere, for example on a body mount or jacket pocket. With such a design, one could increase the size of the battery (increasing useful recording time) and situate camera controls conveniently. Instead of a user interface that is presently on the camera and, therefore, on top of the helmet, the user interface could be situated on the clothing of the user, for example. Likewise, audio microphones and screens for picture preview and playback could be mounted conveniently.

In the foregoing example the mounting accessory was a helmet but action cameras are often used in conjunction with accessories that are considerably larger than the camera itself or even larger than a helmet. Examples of such accessories include poles, water skis, and other sporting equipment, to name a few. Action cameras typically have poor battery life. For example, a popular action camera has a battery life of 1.5 hours with the Wi-Fi feature turned off. Action cameras are best used in an always ready position and where a remote screen is used to view what the action camera is capturing. Even though these presently available cameras are lightweight (some weigh only three to four ounces without their waterproof housing), they could be lighter with the battery removed and placed in an accessory. Even more importantly, larger batteries could be used resulting in extended battery life. The accessory mount, by its attachment mode (i.e., where it attaches and how) may define the acceptable maximum battery size and therefore it may determine how much power is available to the camera. For instance, a tripod can support a much larger battery than a helmet can. A chest mount could have a power supply supported by the straps that mount the camera to the chest instead of being artificially limited to a small battery inside the camera. Such chest mount could support a camera with a gimbal stabilizer capable of recording high quality video even as the user moves. This inventive architecture would also allow mounting devices such as additional radios that may not be needed for all uses but that may be needed for specific applications.

Actions are often filmed using automatic cooperative tracking wherein a base station is communicatively coupled with a remote device and is configured to receive information about the location of the remote device. The base station controls a positioner to orient a camera based at least in part on interaction with the remote device. A problem with such devices is that while it is desirable that they enable camera control, there are a large variety of cameras in use wherein each has their unique and sometimes proprietary control access. Thus, it is not practical to provide automatic tracking system with camera controls for all types of cameras. It is advantageous to provide a system wherein the camera is an integral part of the tracking device. This invention provides automatic tracking systems with a variety of integration levels or architectures. In a preferred embodiment, this invention provides such a system wherein the base station controls the operation of the camera. In another preferred embodiment, this invention provides automatic tracking systems wherein the positioner and the camera are unitarily integrated and the base station controls the positioner and the camera using wireless communication.

For automatic tracking systems it may also be beneficial to move the controls and battery away from the camera itself. These systems are typically tripod based and tripods can accommodate batteries for all parts of the system (with the exception of the remote unit). The advantage is that removing these parts makes the camera lighter and hence more nimble. This may be very useful for filming fast-paced actions, like car races. Furthermore, controls can be separated from the camera making it even lighter and controls may be provided either as part of the base station or as part of a remote control device that is also used for automated cooperative tracking of the user who carries the remote device.

At least one intended application of the inventive systems of the present application is recording sporting events during which the remote device (together with the subject) may be exposed to harsh conditions, such as being temporarily submerged in water or hit against hard objects. Thus, one of the objectives of such systems is to make the remote device waterproof and shockproof. Further, since the remote device is located with the subject, recording of sound at the location of the subject is an important feature.

In the following discussion of the present invention, there are two related but distinct concepts that are worth clarifying. First, some units or devices are described as separate, or as housed separately. These expressions are used as opposed to the word integrated and means that the units or devices may be physically connected but that the connection is temporary, i.e., the units may be removed from each other without opening lids, doors, and the like. For example, a teleobjective lens of a camera would be a separate unit. Conversely, a battery placed inside a digital camera is not a separate unit even though it may be removed and replaced. A battery pack that is outside the digital camera is a separate unit. Second, during use, some units or devices may be co-located with a person, perhaps a subject or a user. The expression co-located is used herein to mean that the person who is co-located with a unit or device can reach the unit or device without substantially moving to a new location. For example, the user of an automatic recording system is co-located with a remote device used by such system during cooperative tracking but is not co-located with the camera of the same system, even if the camera is just a few yards away. A person would be co-located with the camera if the camera is within reach of the person.

One may think about the inventive devices hereof as an image capturing device comprising an imaging unit equipped with optics, at least one image sensor, at least one image processor, and at least one information storage device, and a separate but connectable mounting unit, a separate but connectable user control interface unit, and a separate but connectable power supply. The mounting unit may house either or both the user control interface unit and the power supply, or may house neither of these units. Some of the units may be spatially separated during use while they are also connected such as to provide support for the imaging unit, and to control and to supply power for the same. The user control interface unit is used to control the image capturing device.

Embodiments of the inventive apparatus hereof may also be an automatic video recording system comprising a digital camera module, an orienting device, at least one power supply module, a control device module, and an interface device module, wherein the digital camera module receives power from a power supply module and is controlled by the control device module. The control device module also controls the orienting device and the orienting device orients the digital camera module. The user can input control commands to and receive information from the control module and from the digital camera module using the interface device module.

Figure 2:
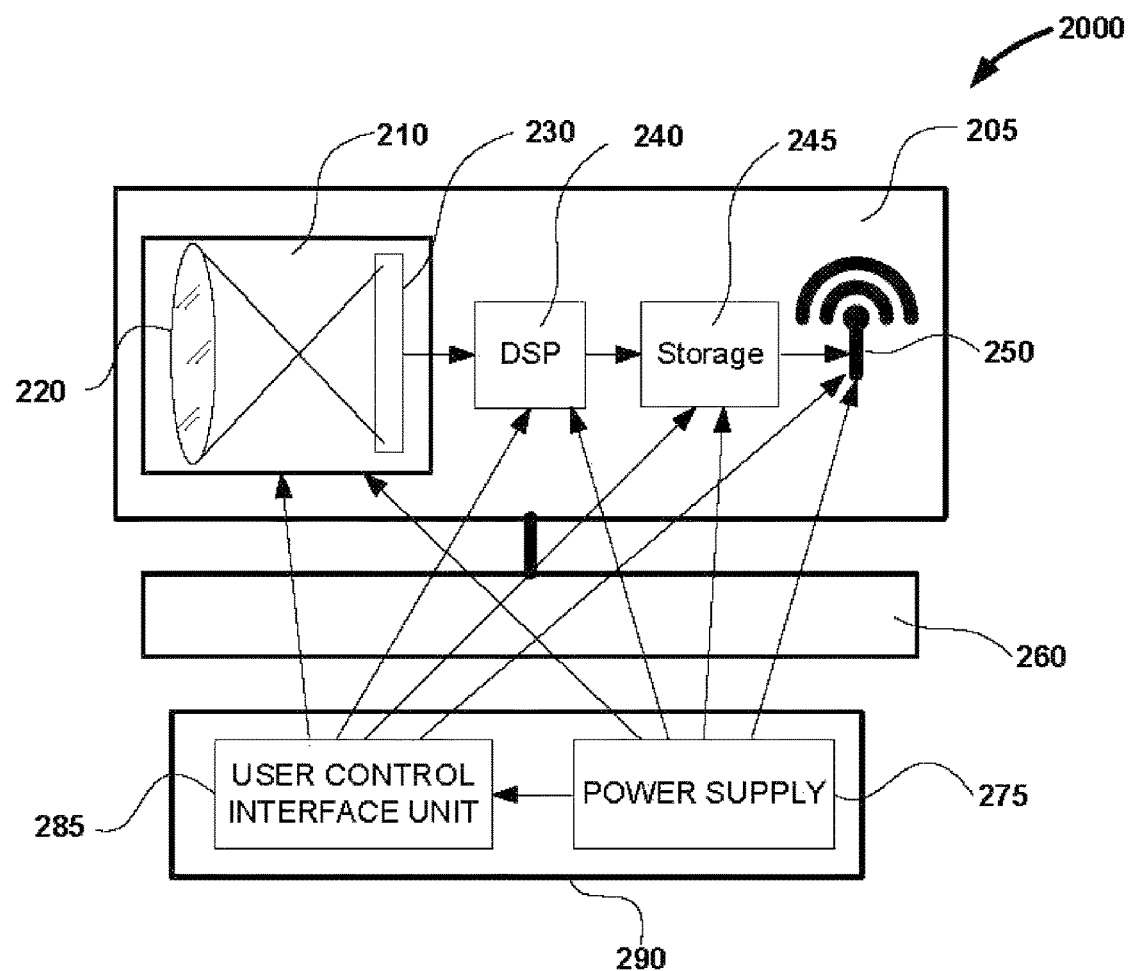
FIG. 2 shows a schematic diagram of the major components of a first embodiment of the image capturing system of the present invention.
Figure 3:
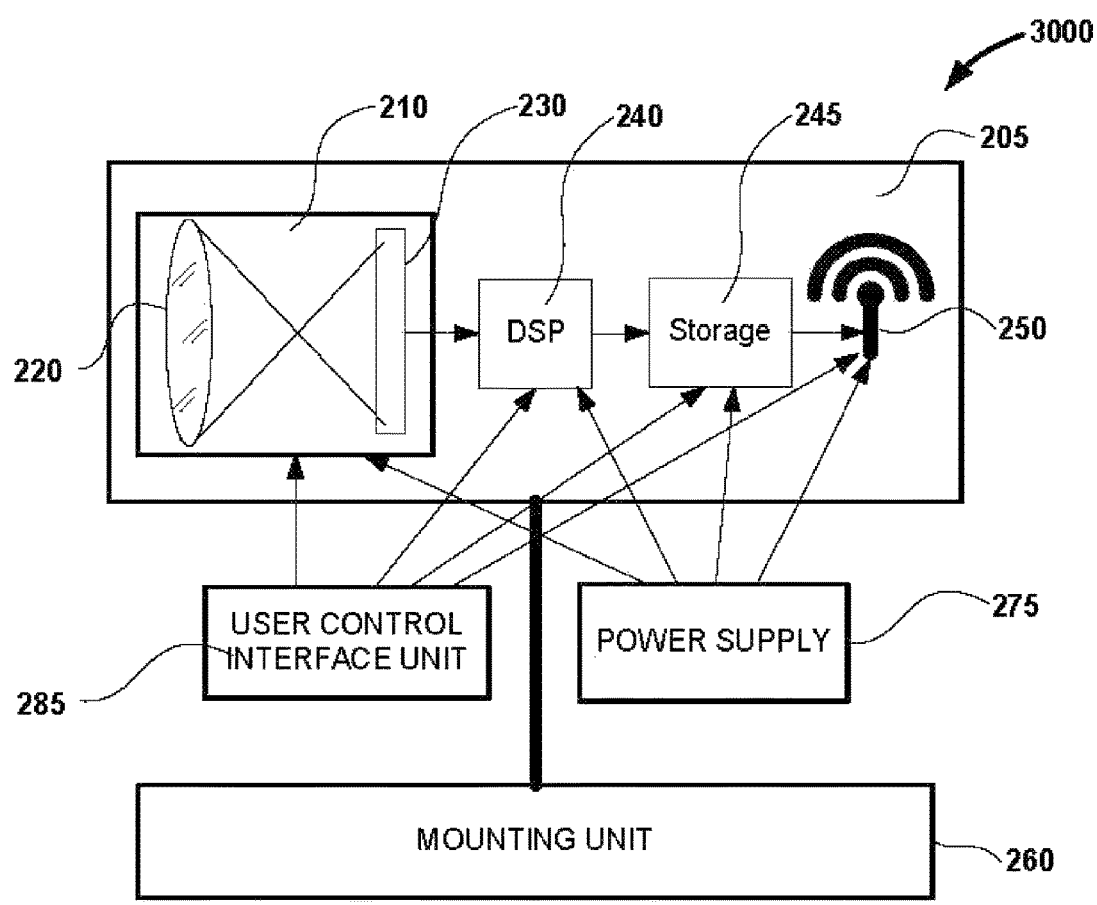
FIG. 3 shows a schematic diagram of the major components of a second embodiment of the image capturing system of the present invention.
Figure 4:
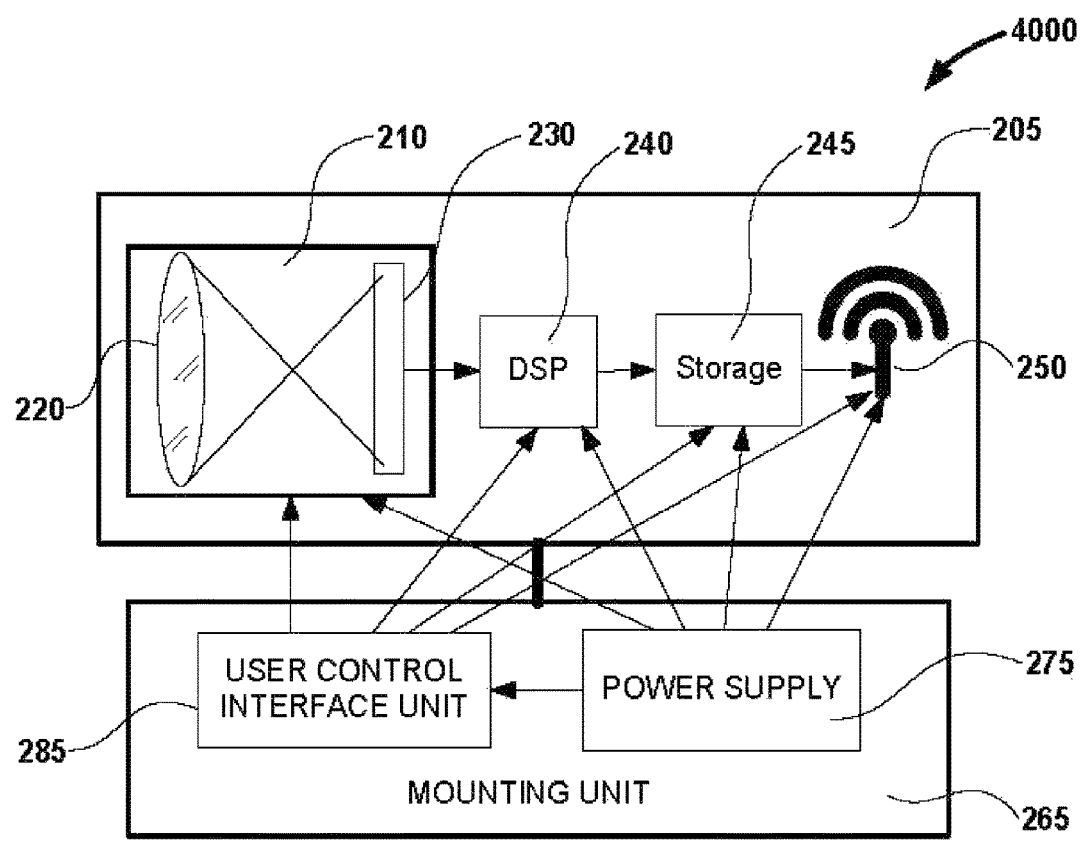
FIG. 4 shows a schematic diagram of the major components of a third embodiment of the inventive image capturing system.

Another way to describe the invention hereof is that it provides for a new method of enabling users to record videos of their (and other's) activities. The inventive method provides users with components designed to record a variety of activities so that they can select among the provided components. Provided are modular units that may be assembled in a variety of ways into an image capturing device. Each modular unit may have multiple variants by size, capacity, or by the way it performs its task, but the variants have common functions as modular units of the image capturing device. The modular units of the image capturing device may be, for example:

an imaging unit, with optics, an image sensor, an image processor, and a data storage device used to store images captured by the image sensor and processed by the image processor (see, e.g., image recording unit 205 shown in FIGS. 2, 3, and 4);

a mounting support that mechanically engages the imaging unit to support and orient the image capturing device (see, e.g., mounting unit 260 shown in FIGS. 2, 3, and 4);

a user interface control unit and a power supply module in a common housing but housed separately from the image capturing device and from all other modular components (see, e.g., new device 290 shown in FIG. 2);

a user interface control unit housed separately from the image capturing device and from all other modular components (see, e.g., user control interface unit 285 shown in FIG. 3);

a power supply unit comprising at least one power supply, housed separately from the image capturing device and from all other modular components (see, e.g., power supply 275 shown in FIG. 3);

a mounting support, a user control interface and a power supply in a common housing but housed separately from the image capturing device and from all other modular components (see, e.g., mounting unit 265 shown in FIG. 4).

Providing these and similar modular components permits a user to select, based on the activity to be recorded, a suitable video recording device architecture with appropriate optics, user control device, mounting, and power source, all specifically selected for being suitable for the activity to be recorded. For example the user may select additional power supply component(s) for extended recording time, smaller power supply when the weight of the power supply may be burdensome, additional video storage capacity for recording long sessions (especially when saving to the cloud is either not available or not preferred), mounting accessories for mounting the recording device on a person in a variety of ways (helmet mounts, chest mounts, etc.).

Certain embodiments of the inventive device may be used in the following manner. A camera is employed to acquire images during automatic video recording of a moving subject having a velocity of movement. The system acquires location data for the camera and for the subject, determines a distance between the camera and the subject, estimates uncertainties of locations of the camera and of the subject, determines the velocity of the subject's movement, calculates a required field of view based at least on the distance between the camera and the subject, on the estimated uncertainties of the locations of the camera and of the subject, and on the velocity of the subject's movement. The images are acquired repeatedly and saved as images corresponding to the calculated required field of view.

In another preferred embodiment the modular architecture that is described with the aid of FIGS. 1-4 and 16 below provides for cameras supported on wearable items (e.g., helmets) and these cameras are capable of automatically tracking a subject other than the user who is wearing the camera. In a related embodiment, the same camera that is a pan-tilt-zoom (PTZ) camera when tracking a subject is converted into an image-stabilized POV camera when not in tracking mode. This conversion may be automatic in both directions; if there is a subject associated with a tag (also referred to as a remote device when certain configurations are discussed, as in reference to FIG. 5 below) in the vicinity, the camera (in PTZ mode) automatically will be recording the activities of that subject, provided the camera and tag are paired. A discussion of the concept of pairing appears below with reference to FIG. 11. If no paired tag is in the vicinity, the camera is stabilized and its zoom lens is adjusted such that it works as a POV camera.

MEMS (micro-electro-mechanical systems; including but not limited to accelerometers, gyroscopes, and the like) hardware both in the cameras and in the tags in combination with appropriate firmware enables them to become paired by simply "bumping" them with each other. During such action the coincidental acceleration is registered. Subsequent "bumping" of further cameras and/or tags may enlarge the circle of hardware that operates together as paired devices.

FIG. 1 shows a schematic diagram of the major components of a conventional digital camera 200. Camera 200 is mounted on mounting implement 260, as shown. Mounting implement 260 could be a tripod or, in the case of an action camera, a helmet or another device. In the case of an automatic recording system (described further below), mounting implement 260 may be an orientation controller. In other applications mounting implement 260 may be a "passive" device that simply replaces the hand that otherwise would hold the camera. Indeed, mounting implement may not be needed if the videographer or photographer is willing and able to hold the camera during recording.

As illustrated in FIG. 1, camera 200 comprises optics 210 (which may be considered a combination of lens system 220 and image sensor 230). In modern digital cameras, image sensor 230 is a pixelated device that requires electrical power to operate and connections to read the information from the sensor. The electrical connections to image sensor 230 are not shown. Battery power from battery 270 is connected to optics 210 because focusing of optics 210 may also require electrical power. The information read out of image sensor 230 is transformed by digital signal processor (DSP) 240 and stored in storage device 245. In many cameras, images may be transferred from the camera using wired connections (not shown) or via radio 250 to personal devices or to a cloud-connected device or service. Battery 270 provides power to the electronic parts described, as shown. Camera 200 is also shown equipped with user control interface 280 that allows the user to control the settings and operation of all electronic elements mentioned. In FIGS. 1-4 and 16, a heavy line drawn from the mounting implement (which may also be referred to herein as a mounting unit) to the camera or to the inventive image recording unit is used to indicate a mechanical connection.

A preferred method of the present invention involved providing a user with image-capturing and related components wherein the components are selected and arranged by a user to record a variety of activities. According to a preferred embodiment hereof, modular units or components are provided that may be assembled by users in a variety of ways into an image capturing device. The modular units preferably have multiple variants. According to the preferred method hereof, the provision of the modular image capturing device units permits a user to select, based on the user-desired activity to be recorded, from the modular components to interface with an imaging unit to provide user-desired optics, user control, mounting, and power suitable for the activity to be recorded. FIGS. 2-4 and 16, for example, illustrate various configurations of the modular units forming an image capturing device.

FIG. 2 shows a schematic diagram of the major components of a first embodiment of the inventive image capturing system of the present invention. FIG. 2 illustrates an assembly of modular components forming image capturing device 2000. The system shown in FIG. 2 comprises image recording unit 205. Notably, image recording unit 205 replaces camera 200 of FIG. 1. Image recording unit 205 (at least embodying herein an imaging unit) preferably comprises optics 210. Optics 210 comprises a combination of lens system 220 and image sensor 230, as shown. Variants of image recording unit 205 are preferably provided having different types of optics (e.g., a fisheye lens). The information produced by image sensor 230 is read out and transformed by digital signal processor 240 and stored in storage device 245. Images can be transferred using a wired connection (not shown) or via radio 250 to personal devices or to an cloud connected cloud or service. Image recording unit 205 also comprises appropriate connectors (not shown) to power supply 275 and to user control interface unit 285; however, power supply 275 and user control interface unit 285 are not parts of image recording unit 205. Rather, power supply 275 and user control interface 285 are integrated into a new device 290. Image recording unit 205 of FIG. 2 is preferably much lighter than a conventional camera. Connections for power delivery and for control of image recording unit 205 may be executed in a variety of ways, including both wired connections (e.g., via USB ports) and wireless connections. Mounting unit 260 is retained as a separate unit that supports image recording unit 205. Variants of mounting unit 260 are preferably provided and may include a helmet mount, chest mount, tripod, etc.

FIG. 3 shows a schematic diagram of the major components of a second embodiment of the inventive image capturing system of the present invention. FIG. 3 illustrates an assembly of modular components forming image capturing device 3000. The embodiment shown in FIG. 3 differs from the embodiment shown in FIG. 2 in that user control interface unit 285 and power supply 275 are separate units not integrated into a new device (i.e, new device 290 of FIG. 2). A user may choose such a configuration of modular elements so that the camera may be mounted with the battery power and user interface located elsewhere, for example on a body mount or jacket pocket.

FIG. 4 shows a schematic diagram of the major components of a third embodiment of the inventive image capturing system of the present invention. FIG. 3 illustrates an assembly of modular components forming image capturing device 4000. In the embodiment shown in FIG. 4, user control interface unit 285 and power supply 275 are integrated with mounting unit 265, as shown. Mounting unit 265, is different from mounting unit 260 shown in FIGS. 1-3 in that it is no longer a passive device for mechanical support only. Those with skill in the art will now appreciate that further variations wherein only either user control interface unit 285 or power supply 275 is integrated with a mounting unit.

Figure 5:
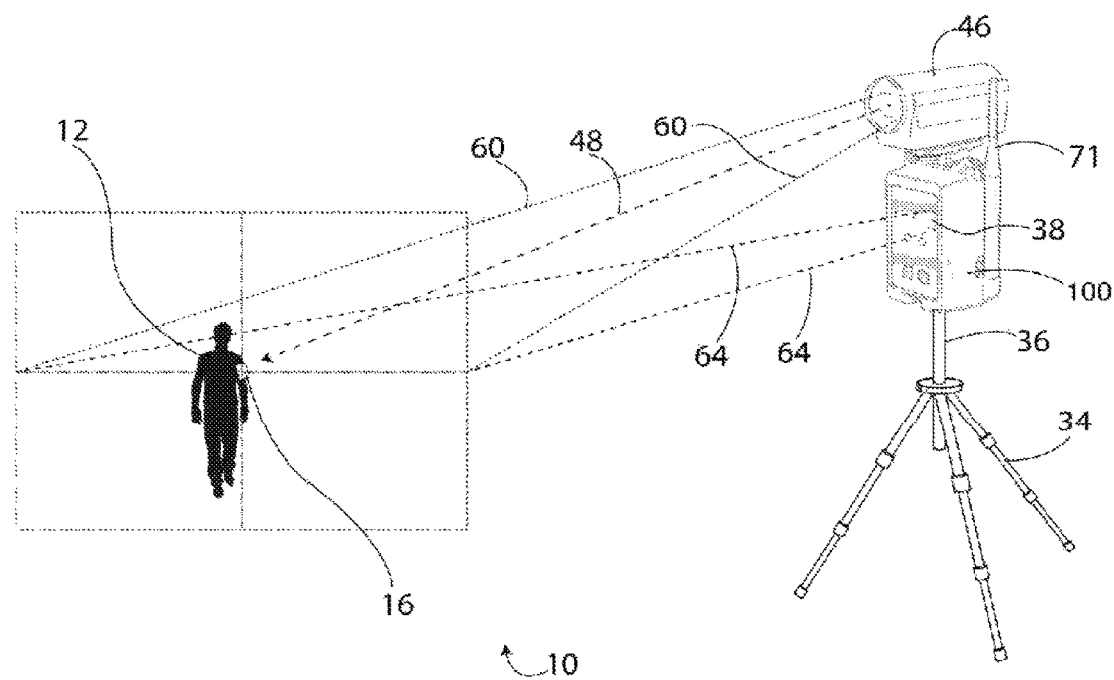
FIG. 5 shows a schematic diagram illustrating an embodiment of an automatic video recording system.

FIG. 5 shows a schematic diagram illustrating an embodiment of an automatic video recording system 10. In the system shown in FIG. 5, camera 46 is mounted on top of orientation controller 100. Orientation controller 100 is mounted on mast 36 of tripod 34, as shown. Automatic video recording system 10 is portable so that it may be taken to and set up at a recording venue. Automated video recording system 10 is configured to track subject 12 associated with remote device 16 as subject 12 moves freely in the environment. In the embodiment shown in FIG. 5, orientation controller 100 pans and tilts camera 46 such that camera 46 points at subject 12 and remains pointed at subject 12 as he or she moves. It is noted that subject 12 is shown as a person, but subject 12 may also be an animal or an object. Accordingly, the camera axis (the axis of the lens, or lens system, of camera 46) points in the direction of pointing vector 48 between camera 46 and subject 12. Strictly speaking, camera 46 points in the direction of remote device 16. This is, in part, due to communication between orientation controller 100 and remote device 16. Orientation controller 100 preferably comprises antenna 71, as shown. Antenna 71 serves to facilitate communication with remote device 16.

In the embodiment shown in FIG. 5, the zoom of camera 46 is preferably adjusted so that subject 12 is entirely within the field of view (FOV) 60 of camera 46. Optionally, a light source, namely, light emitting diode 38, illuminates FOV 60 giving subject 12 feedback regarding whether or not camera 46 is appropriately oriented at subject 12. The light source beam is depicted as beam 64.

The components of automatic video recording system 10 may be configured and integrated in a number of different ways in keeping with different embodiments of the invention described here.

Figure 6:
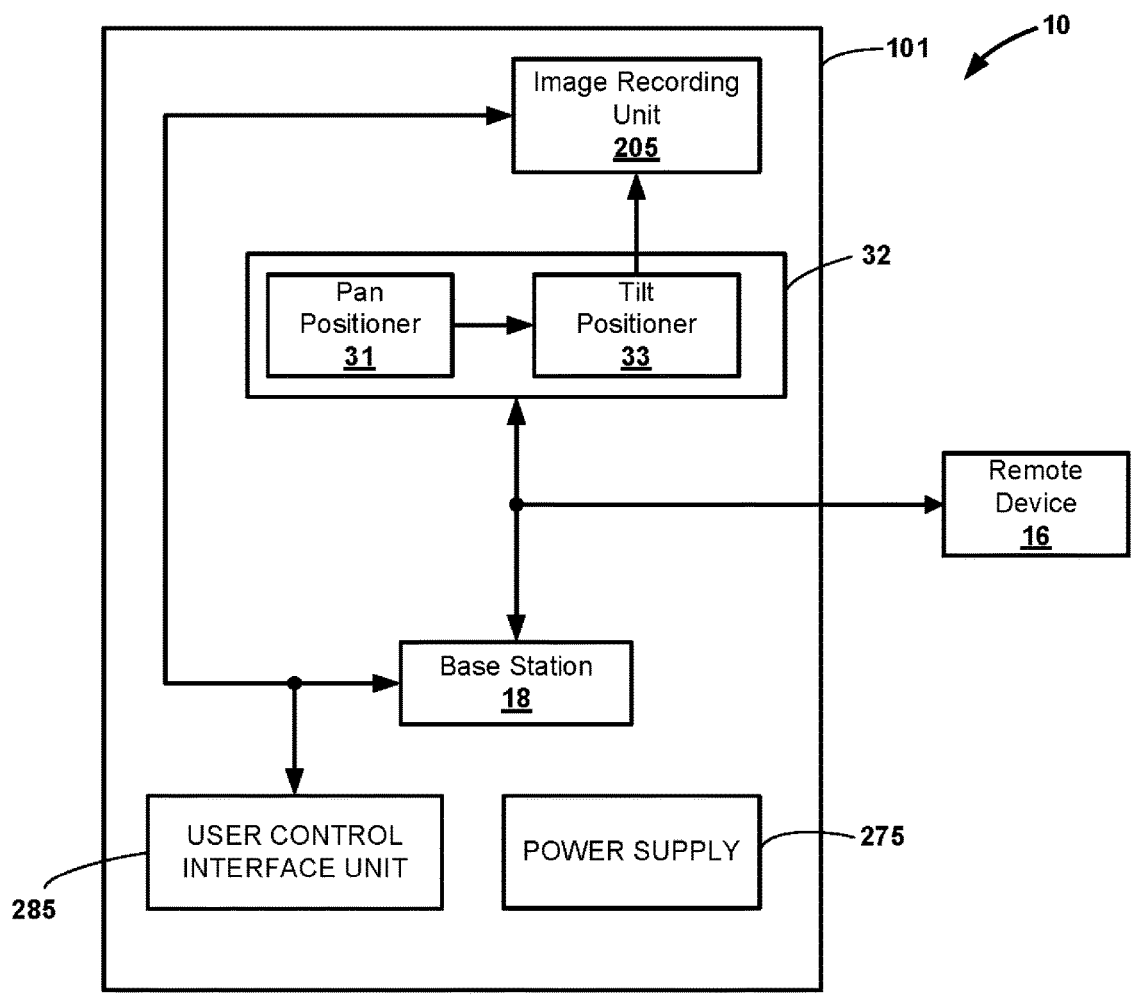
FIG. 6 shows a block diagram illustrating a preferred "all in one" embodiment of an automatic video recording system.

FIG. 6 shows a block diagram illustrating a preferred "all in one" embodiment of an automatic video recording system. In FIG. 6, automatic video recording system 10 comprises image recording unit 205, positioner 32, base station 18, user control unit 285, power supply 275, and remote device 16, as shown. Positioner 32 comprises pan positioner 31 and tilt positioner 33, as shown. In automatic video recording system 10, all units, except remote unit 16, are integrated into recording unit 101. In FIGS. 6-9, important connections are indicated with arrows. However, arrow connections of power supply 275 are omitted for clarity.

Automatic video recording system 10 of FIG. 6 differs from automatic video recording system 10 shown in FIG. 5 in that in FIG. 5, camera 46 is separate from pan positioner 31, tilt positioner 33, and base station 18, all of which are integrated in what is described with reference to FIG. 5 as orientation controller 100. Also, camera 46 of FIG. 5 comprises controls and power supply.

Referring to FIG. 6, recording unit 101 is preferably mountable on a tripod or any appropriate support. In some embodiments, the support may also travel. Base station 18 communicates with remote device 16. In a preferred embodiment, the communication between base station 18 and remote device 16 is by two-way radio communication and the current location of remote device 16, determined using LDT, is sent to base station 18.

Base station 18 communicates with and commands pan positioner 31 and tilt positioner 33 based on information sent to base station 18 from remote device 16. The output commands from base station 18 may comprise voltage signals that represent the necessary pan and tilt angles and angular velocities to positioner 32. Such commands are preferably based on a procedure that provides smooth and efficient positioning of recording unit 101 and integrated image capturing device 205 to generate high quality video. Additionally, commands are sent from base station 18 to image recording unit 205; such commands include, for example, start/stop recording or zoom in/out. Focus and zoom commands may be based on a computed distance between recording unit 101 and remote device 16. The focus and zoom commands are also preferably based on the size and velocity of movement of the subject being recorded. As illustrated in FIG. 6, pan positioner 31 preferably turns tilt positioner 33, and with it, image recording unit 205. Tilt positioner 33 preferably tilts image recording unit 205. Pan positioner 31 and tilt positioner 33 preferably send data about the current orientation of image capturing device 205 to base station 18.

At least one advantage of the automatic video recording system of FIG. 6 is the ability to have well-defined information about the orientation of image recording unit 205 with respect to pan positioners 31 and tilt positioner 33. When setting up the automatic video recording system of FIG. 5, the user may have to carefully mount camera 46 on orientation controller 100 with a well-defined orientation and must generally make sure that the mounting is secure, such that it will not change during the recording. Due to the integration of all components of automatic video recording system 10 into recording unit 101 (FIG. 6) the orientation of image recording unit 205 is defined more precisely and with higher certainty compared with the embodiment of an automatic video recording system wherein camera 46 is mounted on orientation controller 100 each time the system is used (FIG. 5). The automatic video recording system of FIG. 5 is advantageous in that it permits using a variety of existing cameras as recording devices but it also limits automatic camera control to those compatible with the particular hardware and firmware installed in orientation controller 100.

The embodiment of automatic video recording system 10 shown in FIG. 6 has the advantage that image recording unit 205 may be controlled to have the correct zoom and focus during a recording session. Cameras are often equipped with an automatic focus feature; however, such an automatic focus feature focuses on any object or person that may pass in front of the camera including those accidentally passing between camera 46 and subject 12 (FIG. 5). During sporting activities, a host of people and/or objects may pass between the camera and the desired recording subject. A typical camera will adjust the focus when such people or objects pass between the camera and the desired recording subject creating an undesired result. For example, when filming a surfer, a camera with an automatic focus feature enabled may incorrectly change the focal distance based on waves or other surfers. In the case of a soccer game, other players or spectators between the camera and a subject player may cause unintended change in focus. For this reason, in absence of camera control during recording, it is necessary to turn the autofocus of the camera off. The embodiment of automatic video recording system 10 shown in FIG. 6 enables control of the zoom and focus of integrated image recording unit 205 to avoid the above-noted problems.

When recording automatically using systems such as the one depicted in FIG. 5, there is a delay between the movement of subject 12 and movement of camera 46. This delay is mostly attributed to the time lag by LDT used for automatic video recording systems to detect movement of remote device 16. Additionally, time is required for remote device 16 to communicate with base station 18, to compute the desired camera direction, translating the computed directions into corresponding commands for the positioners, and lastly, but very importantly, to actually orient image recording unit 205. As a result of this delay, subject 12 may be outside of the center of FOV of image recording unit 205, particularly when subject 12 moves rapidly. However, autofocus focuses the camera on whatever is at the center of the FOV. This is another reason why the automatic focus feature of a typical camera may not work properly. Base station 18 of the automatic video recording system of FIG. 6 preferably computes the distance between image recording unit 205 and remote device 16 and adjusts the focus of image recording unit 205 so that subject 12 remains in focus. In addition, image recording unit 205 is much lighter than camera 46. Thus, recording unit 101 is more responsive than orientation controller 100.

It is noted that recording unit 101 of embodiment of automatic video recording system 10 shown in FIG. 6 may also be used alone without remote device 16. In such a case, the automatic video recording system may be operated based on image recognition. In addition, recording unit 101 may be operated manually while attached to a tripod or in a handheld manner. It may also be used attached to a sporting or other device (e.g., a bicycle, a surfboard, etc.) for POV recording. With the embodiment illustrated in FIG. 6, a parent at a child's soccer game would be able to pause the automatic recording and tracking of their child in the field and operate the automatic video recording system to take pictures or footage of another player who is not being tracked.

Figure 7:
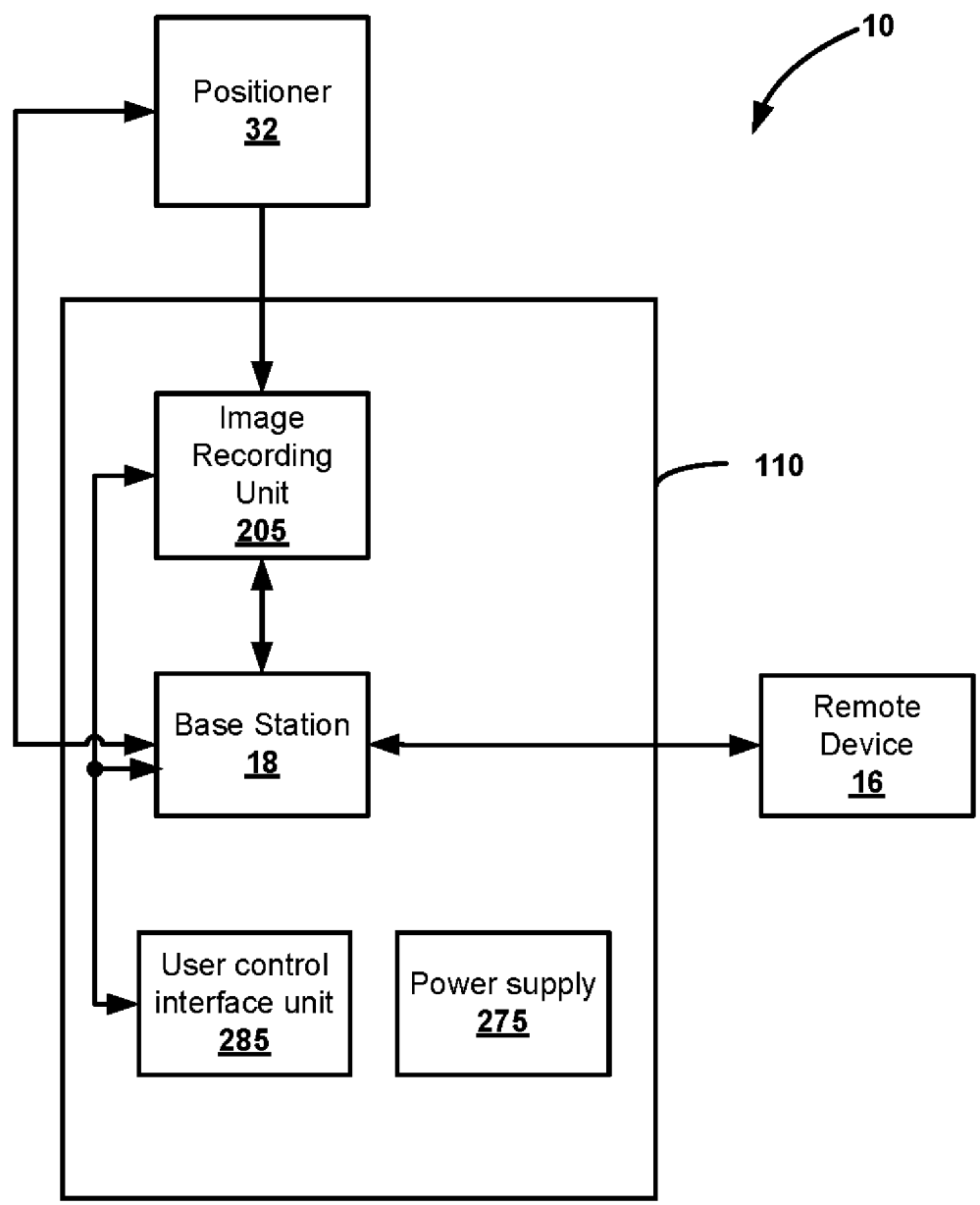
FIG. 7 shows a block diagram illustrating another embodiment of an automatic video recording system.

FIG. 7 shows a block diagram illustrating another preferred embodiment of an automatic video recording system according to the present invention. In the embodiment of FIG. 7 automatic video recording system 10, image recording unit 205 is integrated with base station 18, user control interface unit 285 and power supply 275 into a "smart camera" 110. Smart camera 110 does not include the pan and tilt drive mechanisms thus making it lighter in weight compared with recording unit 101 shown in FIG. 6. Such a weight difference is advantageous for POV filming applications. When used as part of an automatic recording system of FIG. 6, smart camera 110 is preferably connected to positioner 32 to track a subject associated with remote device 16. Smart camera 110 has all advantages of being controllable from base station 18, which is part of it. In addition, smart camera 110 may be completely controllable, including tracking functions from remote unit 16. Moreover, smart camera 110 may or may not have its own power source. Since it is connected to positioner 32 during operation within an automatic recording system, batteries operating the positioner may also be used to operate smart camera 110. When smart camera 110 is operated in a POV mode, power supply 275 may be included in the mounting that holds it or may constitute a separate unit.

Figure 8:
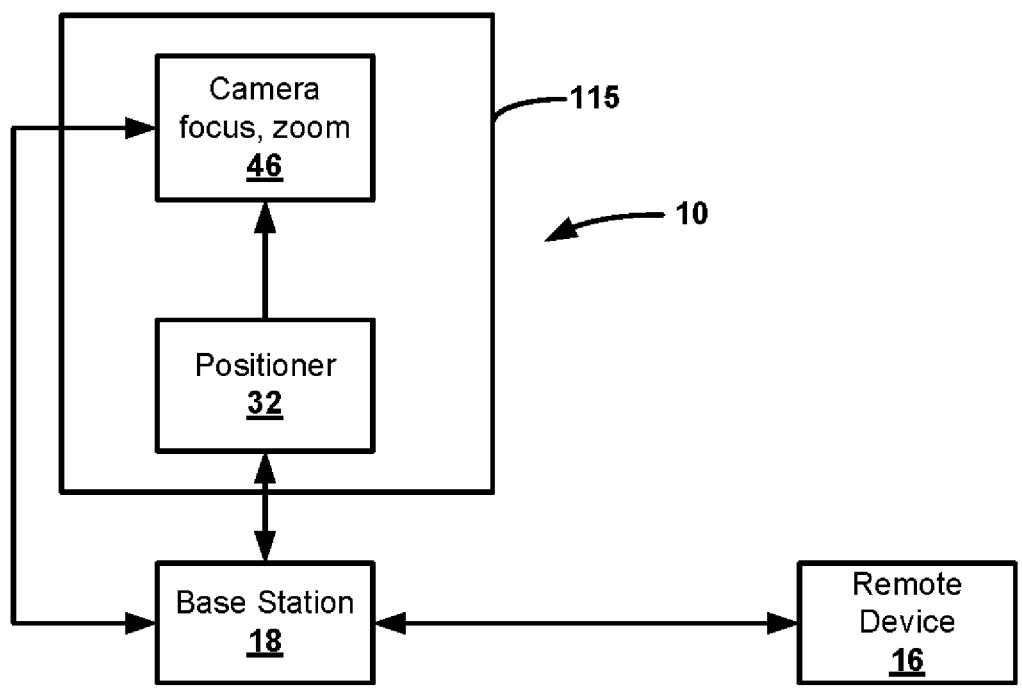
FIG. 8 shows a block diagram illustrating a third embodiment of an automatic video recording system.

FIG. 8 shows a block diagram illustrating yet another preferred embodiment of an automatic video recording system according to the present invention. Automatic video recording system 10 of FIG. 8 comprises camera 46 and positioner 32 (preferably incorporating pan and tilt features) integrated as pan-tilt-zoom (PTZ) camera 115. Base station 18 is communicatively coupled to camera 46 and positioner 32, as shown. Base station 18 controls camera 46 and positioner 32. At least one advantage of the configuration of the automatic video recording system of FIG. 8 is that the camera orientation is fixed with respect to positioner 32. Additionally advantageous, since base station 18 is physically separated from PTZ camera 115, a single base station may be configured to control multiple PTZ cameras 115 and/or multiple automatic video recording systems having various architectures. The difference between common PTZ cameras used in security equipment, for example, and those described herein is that cameras used for recording sporting events are equipped with image stabilization and may be equipped with firmware that compensates for mounting imperfections that are characteristic for field use, i.e., for use when cameras are mounted on tripods and may not be held such that the pan axis is vertical. In addition, PTZ cameras that are not designed for cooperative tracking but rather for observation are controlled either to perform routine movements to cover the observed area or to be activated by motion detectors and follow the subject first detected by the camera after "waking up".

According to a preferred embodiment of the present invention, a single subject with one remote device may be filmed by a plurality of cameras from different angles and/or at different locations. For example, the inventive PTZ cameras 115 may be positioned at different locations (e.g., multiple locations along a soccer field or down a ski slope). In such applications, a single base station may control all PTZ cameras 115 configured to track a single remote device 16. While typical security PTZ cameras are powered from power outlets, PTZ camera 115 is either equipped with its own power supply or receives power from a battery associated with the mounting implement used with the camera.

According to another preferred embodiment hereof, multiple subjects with distinct remote devices may be filmed using multiple cameras wherein the multiple cameras are controlled by a single base station. In embodiments that comprise a plurality of the PTZ camera units similar to those shown in FIG. 8, the base station receives and stores information regarding the current locations of each PTZ camera as well as the locations of each remote device. An important difference between the common PTZ camera based security systems and the inventive system described herein is that the locations of the PTZ cameras of the inventive system are variable and are input in the system as it is set up for a particular event. For example, a coach of a sports team would benefit from such a system as the coach would be able to generate video footage for each player during a game. In addition camera locations may be subject to change even during filming.

Figure 9:
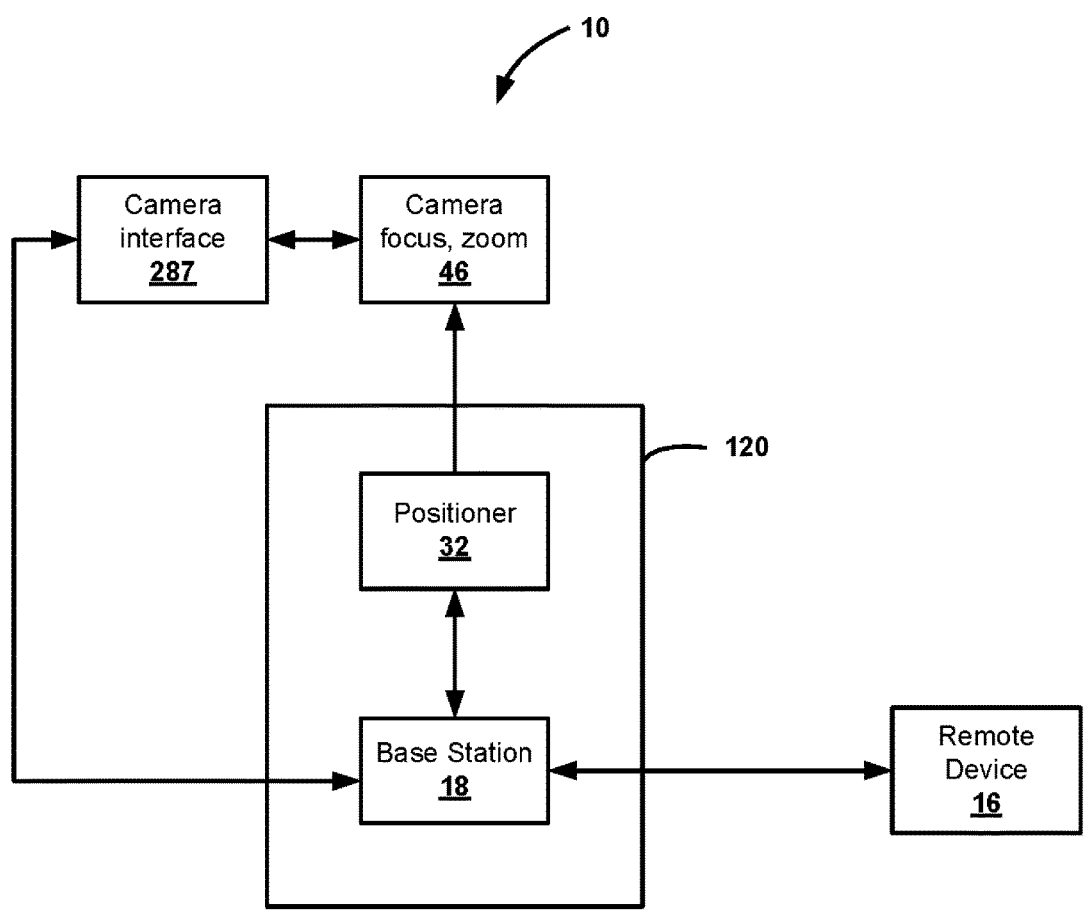
FIG. 9 shows a block diagram illustrating a fourth embodiment of an automatic video recording system.

FIG. 9 shows a block diagram illustrating yet another preferred embodiment of an automatic video recording system according to the present invention. The automatic video recording system of FIG. 9 comprises base station 18 and positioner 32 integrated into pan-tilt-zoom controller 120. Note that orientation controller 100 of FIG. 5 is similar to PTZ controller 120, the difference being that the former does not necessarily comprise camera controls. However, as noted above, the task of creating a universal camera interface is a formidable one. Thus, as a practical solution, PTZ controller 120 is connected with camera interface 287. Camera interface 287 is an exchangeable separate unit that incorporates hardware and firmware that is specific to the particular camera 46 used in system 10. Thus, at least one advantage of the automatic video recording system of FIG. 9 is flexibility of use with a variety of cameras, although the need for the camera interface makes this system more complex and more expensive. Camera interface 287 preferably clips on PTZ controller 120. If one wishes to change cameras and has the interface for each, the change is done simply by clipping on the appropriate interface 287.

A variation of the automatic video recording system embodiment of FIG. 9 is one equipped with a motorized pan and a manually adjustable but non-motorized tilt. Such an embodiment is useful for saving weight and expenses in the case of applications where maintaining a constant tilt during filming is useful. For example, such "panning devices" are perfect for filming surfing because essentially all activity occurs at the water surface.

Figure 10:
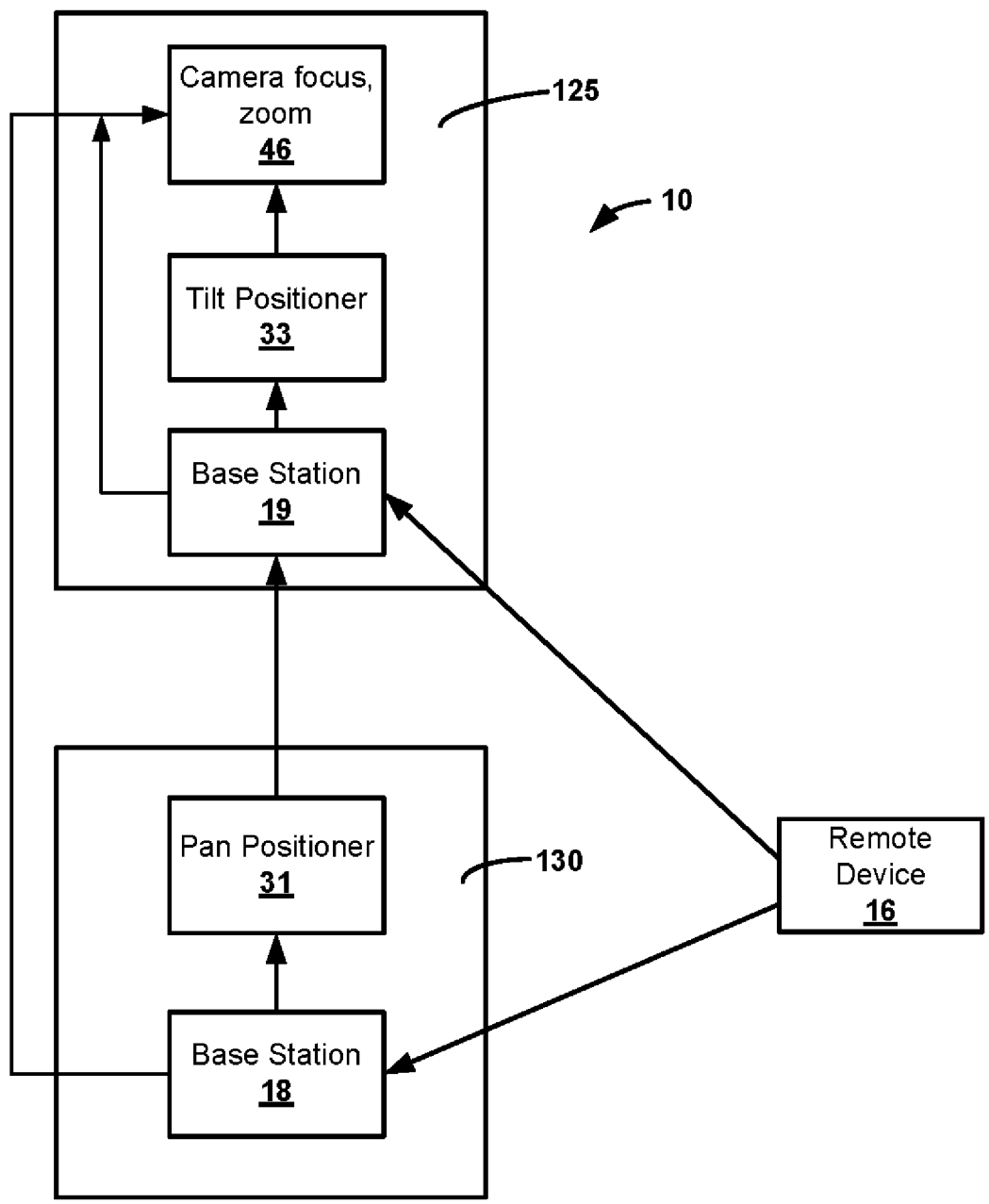
FIG. 10 shows a block diagram illustrating a fifth embodiment of an automatic video recording system.

FIG. 10 shows a block diagram illustrating yet another embodiment of an automatic video recording system. In the automatic video recording system of FIG. 10, pan positioner 31 and tilt positioner 33 are housed separately. Base station 18 and pan positioner 31 are integrated in pan controller 130. Tilt positioner 33 and camera 46 are integrated in camera module 125. In some applications, if the movements of a subject are able to be tracked by pan movement alone (e.g., if there is very little movement in vertical direction), one may choose to use pan controller 130 as a panning device (like orientation controller 100 of FIG. 5) and attach a camera to it. Specialized embodiments for some sporting activities (e.g., bungee jumping, filming drones, filming stars, planets, the moon, etc.) may need an automatic tilt positioner 133. If at the same time a pan positioner is not necessary, pan positioner 130 may be omitted from the system and tilt controller 125 may take over. To facilitate this, tilt controller 125 is equipped with a base station 19 of its own. In this system the base station is duplicated but since it is a relatively small and inexpensive component, this duplication makes sense. The automatic video recording system of FIG. 10 provides users with flexibility to use dedicated devices with only the features (e.g., automatic panning or automatic tilt) the end user desires.

When describing the pan and tilt movements, it is noted that their sequence (order) is reversible as long as both positioners are in operation. However, if one of the positioners is absent, differences in the resulting video footage will be observed. If a constant tilt is combined with automatic panning, the camera motion will be different if the pan positioner moves around a substantially vertical axis compared with a tilted axis. In the case of a substantially vertical axis, the camera will track horizontal motion of a subject at a particular altitude. In the case where the panning device is tilted, the camera will track motion that has a minimum or maximum altitude in the direction that is within the plane of the tilt.

In standard video recording sound is recorded by the video recorder itself. In the case of the automatic video recording systems of the present invention, this method of sound recording is often not optimal since the action being recorded is not in the vicinity of the camera and there is no cameraman to provide comment. Rather, subject 12 of the recording, i.e., the person with remote device 16 of automatic video recording system 10 (see FIG. 5) may wish to record comments. If the motors and gears of orientation controller 70 generate noise, camera 46 will record that noise. Furthermore, it may be likely that camera 46 of automatic video recording system 10 is in the vicinity of other persons disinterested with the recording and the camera may record their unrelated conversations or comments. For all these reasons it may be desirable to replace the sound recorded by camera 46 with a soundtrack recorded by subject 12. This is accomplished by providing a voice-sensing device, such as a microphone, in remote device 16 located with the subject 12. In a preferred embodiment of the present invention, remote device 16 includes one or more voice or sound sensing devices. Further, remote device 16 may be capable of recording and storing sound electronically for later embedding in the corresponding video recorded or transmitting sound information for recording, storing, and/or syncing.

There is a significant advantage to empowering subject 12 to use remote device 16 for recording and transmitting voice commands to orientation controller 100. The use of voice commands may be much easier and efficient during physically demanding sporting activities than alternatives like pushbutton or touchscreen inputs.

Figure 11:
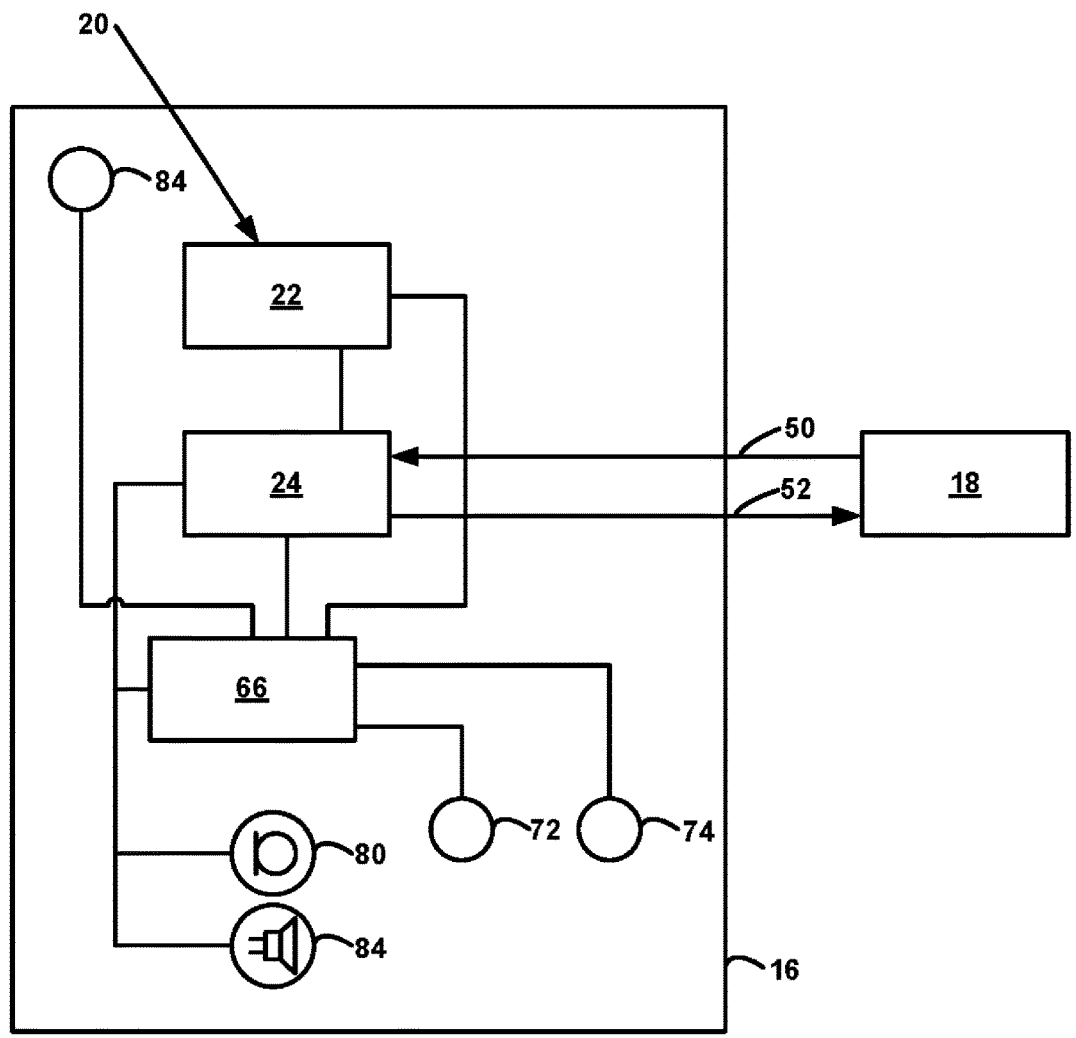
FIG. 11 shows a schematic diagram illustrating the main components of a remote device equipped with a microphone and speaker according to a preferred embodiment of the present invention.

FIG. 11 shows a schematic diagram illustrating the main components of a remote device equipped with a microphone and speaker according to a preferred embodiment of the present invention. The location of the remote device 16 may be determined by global positioning antenna 22 that receives satellite signals 20 (or appropriate terrestrial signals) from a positioning system. An example of such a positioning system is the Global Positioning System (GPS). Alternatively, other LDTs may be employed; in such embodiments some components of remote device 16 would be replaced with components that are appropriate for the particular method of LDT employed. Data received by global positioning antenna 22 is communicated to a microcontroller/memory unit 66 and to a radio transceiver 24. Control buttons 72 and 74 are preferably included to power on and off remote device 16 and for other functions. A status indicator LED 84 preferably shows system readiness. A battery, charger contacts, and a charge indicator LED are also components of remote device 16 but are not shown in FIG. 11. Remote device 16 preferably comprises microphone 80 and speaker 87, as shown.

Microphone 80 outputs electronic signals to microcontroller/memory unit 66 and to radio transceiver 24. Radio transceiver 24 is used for two-way communication (50 and 52) with base station 18 of automatic video recording system 10 shown more comprehensively in FIGS. 5-10 above. The two-way communication indicated by numbers 50 and 52 is preferably via radio waves (however, those with skill in the art will understand that other methods of communication may suffice). The radio transceivers in base station 18 and remote device 16 are preferably paired for each recording session. As a result of the pairing, the radio communication data packets are preferably preceded with an identifier code to avoid interference by unrelated transceivers operating in the same vicinity. In the embodiment shown in FIG. 11, the position data obtained with the aid of global positioning antenna 22 is transmitted to base station 18; base station 18 commands a positioner (or a multiplicity of positioners) to orient an associated camera (associated cameras) in the direction of remote device 16. Remote device 16 is preferably an easily transferable device so that, for example, one surfer can easily pass it to another. Camera 46 of automatic video recording system 10 tracks and records whoever has remote device 16.

In a preferred embodiment base station 18 can control "on/off", "record/stop recording", and other functions of camera 46. With this type of control, the target or subject of the recording may use the communication feature between remote device 16 and base station 18 to control various aspects of the recording. The control may be exercised by physically engaging a button switch or touch sensor or alternatively by voice. For example, a surfer can speak the word "RECORD" when he begins to paddle to a wave and speak "STOP" when he or she wishes to stop recording. This feature is advantageous in that it eliminates the need to watch hours of surfing video to find those portions where the subject is actually surfing (which may be only a few minutes long). In another embodiment, the user may send commands to the camera to take a burst of high quality still images.

In a preferred embodiment, sound is recorded at remote device 16 and transmitted to base station 18 and synchronized with the captured video. The audio information transmitted is discretized into audio information packets. Each audio information packet is time stamped and transmitted to base station 18. Base station 18 verifies that the audio information packet was not corrupted during transmission and communicates with remote device 16 that the audio information packet was received correctly. If the audio information packet was corrupted, base station 18 communicates to remote device 16 to resend the audio information packet which base station 18 has designated as being corrupted. The audio information packet is matched to the appropriate time in the recorded video using the timestamp information. This process repeats while automatic video recording system is operating. Base station 18 communicates with remote device 16 to verify that it has received all of the transmitted audio information packets. If any audio information packets were never received by base station 18, base station 18 communicates to the remote device which time periods are missing and the audio information packets corresponding to those timestamps are resent from remote device 16 to base station 18. While the above is described with respect to an automatic video recording system, this process may be applied to any application where audio information is captured by a device separated from a recording device.

In another preferred embodiment of the present invention, a copy of the recorded sound file is stored at remote device 16 in addition to transmitting audio information packets to base station 18. Storing recorded audio at remote device 16 is beneficial in that if the communication link between remote device 16 and base station 18 is compromised, the audio from remote device 16 may be used as a backup.

There are other functions of base station 18 that subject 12 may wish to control. For example, one could control positioner 32 to adjust or recalibrate the orientation of the camera 46 using remote device 16. Such control may be operated by pushing appropriate buttons or by interfacing with a touch screen embedded in remote device 16. Additionally, and preferably, such controls may be voice actuated so that the operation is hands free.

Positioner 32 is preferably designed to minimize noise associated with the mechanical components that may produce undesired sound (e.g., motors, gearboxes, etc.). This is achieved through incorporating noise shielding, physical dampening, and/or noise absorbing material in positioner 32 or in camera orientation controller 100. These design measures may increase the cost and weight of the equipment but are useful if the sound is recorded by the camera 46. Providing a soundtrack recorded by subject 12 makes dealing with noise issues associated with the positioner or camera orientation controller less necessary. Nevertheless, sound sensing and recording by the camera 46 may be useful. For example, even if a cameraman is not needed to operate the camera, friends nearby the camera may wish to periodically comment on the recording.

It may also be useful to record sound by base station 18 as well if base station 18 it at a separate location; see, e.g., FIG. 8 where the embodiment shown permits separation of base station 18 and PTZ camera 115. In such an embodiment, several cameras and several remote devices may be controlled by a single base station. Base station 18 could be controlled by an operator who oversees recording by all cameras and who would add meaningful commentary to the recording. In a related embodiment, a person located at base station 18 may communicate to the tracked subject 12 through remote device 16. In this embodiment, base station 18 and remote device 16 preferably have two-way voice communication by radio.

According to a preferred embodiment hereof, remote device 16 is waterproof and shockproof. Waterproofing and shock proofing may be achieved by embedding or enclosing the components of the remote device in a polymer (with the exception of those surfaces that need to be exposed to provide electronic, electrical, or optical interfaces and touchscreens). In such an embodiment, the polymer has an inside surface and an outside (exposed) surface. The inside surface is preferably in direct contact with the electronic and mechanical parts of the remote device unit. The outside surface of the polymer is part of the surface of the remote device and may serve in part as the cosmetic surface of the remote device. The outside surface of the remote device also includes surfaces of electrical or electronic contacts, surfaces of light pipes, lenses, and surfaces of screens, touchscreens, and the like. The outside surface can also include surfaces of microphones and speakers. While there are waterproof solid microphones available, a problem may arise when such a microphone is used while it is still wet from having been submersed in water immediately prior to use.

For this reason, microphones may also be mounted at an inner end of a narrow conduit such that reverse capillary action keeps water away from the sensor surface of the microphone. The outer end of the conduit is at the exposed surface of the remote device and the conduit leads away from the exposed surface. The inside surface of the conduit is hydrophobic and the microphone is mounted at the end of the conduit that is away from the exposed surface of the remote device. A funnel-like member between the end of the conduit and the sensing surface of the microphone may be used to mount a microphone that has a sensing surface area that is larger than the cross section of the narrow conduit.

One example of an application using the principles of the present invention includes filming a television show, such as a "reality" television show. The systems hereof may be used to film a scene in a crowded area without disturbing the scene (or without the expense of multiple camera crews). The reality television subject wears or otherwise is associated with a remote tracking device having a microphone so that all footage and events are captured as they occur. Multiple subjects may wear additional remote tracking devices with additional microphones. Cameras may be set up at different angles and elevations to track a single subject or multiple subjects or some combination thereof. Voice recordings may be time stamped to match them with the recorded images for later editing and production.

FIGS. 5-10 show automatic video recording system 10 configured to detect the location of and track subject 12, such as a participant in a sporting event. Automatic video recording system 10 preferably comprises remote device 16, preferably collocated with subject 12, base station 18, positioner 32, and camera 46. Base station 18 and remote device 16 preferably comprise microcontrollers and communication devices. Base station 18 determines a pointing vector 48 between camera 46 and remote device 16 based in part on sensor data obtained at the location of camera 46. For further details, reference is made herewith to the '803 Patent Application incorporated by reference above. As subject 12 moves together with remote device 16, pointing vector 48 is updated and base station 18 determines any angular position change and any change of zoom and focus necessary to keep the subject 12 within frame 60 of camera 46. The zoom angle is defined by the lines 60.

According to a preferred embodiment of the automatic video recording system 10, a unique radio channel is used for two-way communication by a pair of remote device 16 and base station 18 that belong to the same user. According to another preferred embodiment hereof, multiple base stations 18 and remote devices 16 all use the same channel to communicate, but employ unique identification codes to pair a particular base station 18 with a particular remote device 16. In such a preferred embodiment, a packet collision avoidance process may be used to ensure that paired units easily communicate with each other while not disturbing or being disturbed by other base station-remote device pairs that may be in use in the same area. This is used to make the communication unique and allows the simultaneous use of several automatic video recording systems in the same vicinity.

Figure 12:
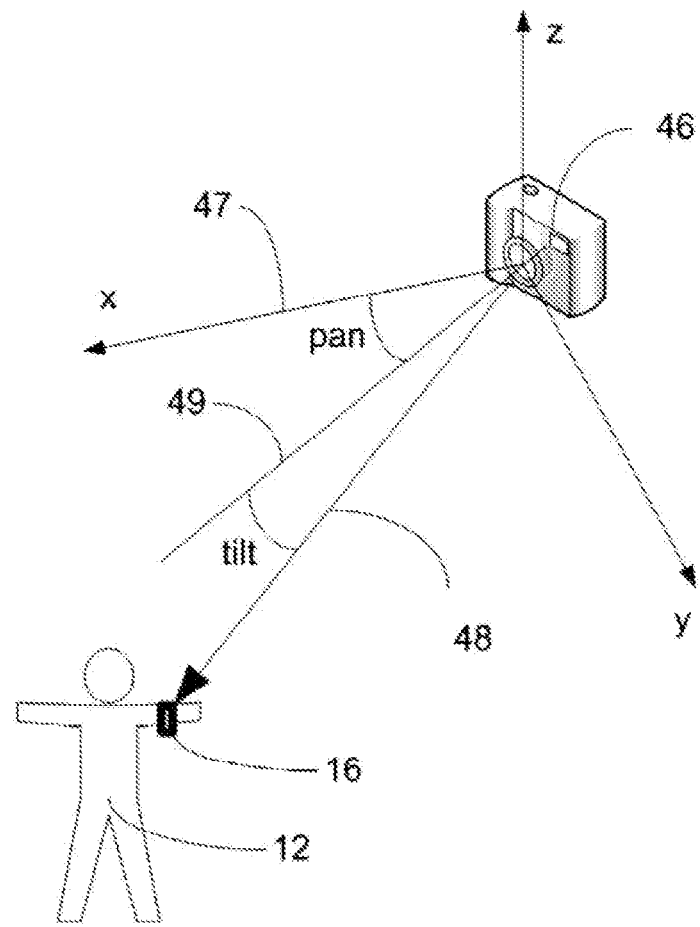
FIG. 12 shows a schematic diagram illustrating the angular relationship of various components of an automatic video recording system.

FIG. 12 shows a schematic diagram illustrating the angular relationship of various components of an automatic video recording system. More specifically, FIG. 12 illustrates the angular relationships between a camera of an automatic video recording system and the subject being filmed. The orientation of pointing vector 48 may be described as an angular deviation from original pointing direction 47 of camera 46. In an earth fixed coordinate system centered at location of camera 46, an orientation angle may be thought of as a sum of a pan angle and a tilt angle. It is convenient to think about the earth fixed coordinate system as having the x axis along initial direction 47 of camera 46. The pan angle is in the xy plane of the coordinate system between directions 47 and 49. The tilt angle is between the directions 49 and 48, in a plane that is perpendicular to the xy plane.

Base station 18 outputs positioning commands to positioner 32 and camera operation commands to camera 46. Positioner 32 positions camera 46 to point along the relative position pointing vector 48 at remote device 16, and the zoom level of camera 46 is set such that the field of view of camera 46 is larger than subject 12. Further, the focal distance of camera 46 is controlled so that subject 12 is in focus. The choice of the optimal frame size is generally a compromise between the desire to zoom in as much as possible in order to show as much detail as possible while keeping subject 12 within the FOV without excessive rapid camera movements given any limitations of the LDT used. These limitations include limited precision and finite response time (lag time).

Choosing optimal frame size may be accomplished in a variety of ways. In a preferred embodiment for creating videos, the default of automatic video recording system 10 is to record frames that are somewhat larger than human size. It is useful to provide user control for the desired zoom level. For example, for recording surfing sessions where large waves are present, a user may wish to have the entire wave in the field of view. In another preferred embodiment, for recording sporting applications with rapid movements, it is useful to record frames that are significantly larger than the human subject 12. In such applications, if the recording frame is too small with respect to the subject, the subject may get to the edge of the frame very quickly. The camera orientation is adjusted to track subject 12, and if the FOV is narrow, the camera orientation may have to be adjusted too rapidly for a pleasant viewing experience.

Figure 13:
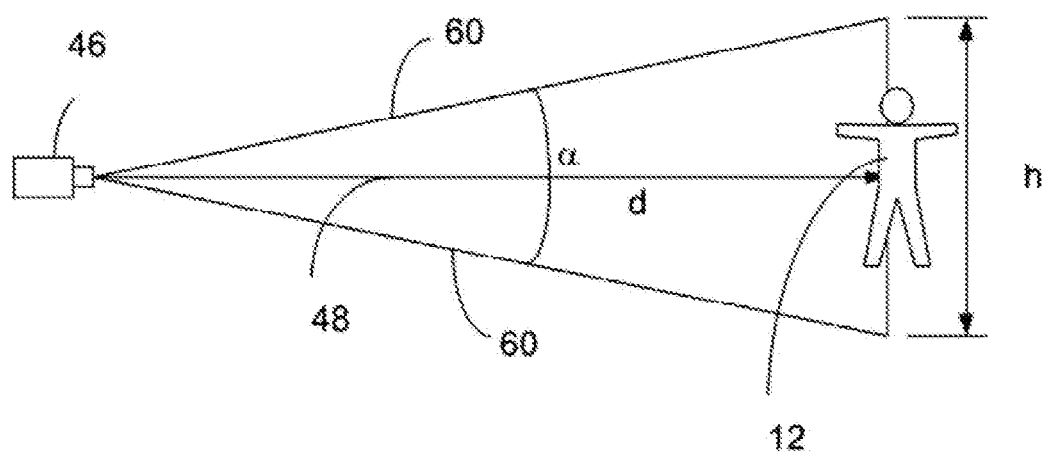
FIG. 13 is a schematic drawing of the geometric relationships pertinent to zoom angle calculation.

FIG. 13 is a schematic drawing of the geometric relationships pertinent to zoom angle calculation. Since the distance d between camera 46 and subject 12 is known by virtue of LDT, the zoom angle $\alpha$ between the lines of FOV 60 of camera 46 may be calculated for a FOV of size h. For example, if h=40 feet and the distance is d=400 feet, the zoom angle may be expressed as $\alpha = 2 \arctan h/2d \approx 5.7°$. In an embodiment where the automatic video recording system is intended for use in a variety of applications, it is advantageous to enable user input of a particular application type by choosing the estimated frame size or by inputting the size of the subject 12. For example, in a kite surfing application, one may want to zoom out to a wide angle that allows the kite, which can be 25 meters above the subject kite boarder, to be inside the frame.

It is also advantageous to zoom out when the accuracy of the LDT becomes questionable or the LDT signal is lost or is intermittent.

Figure 14:
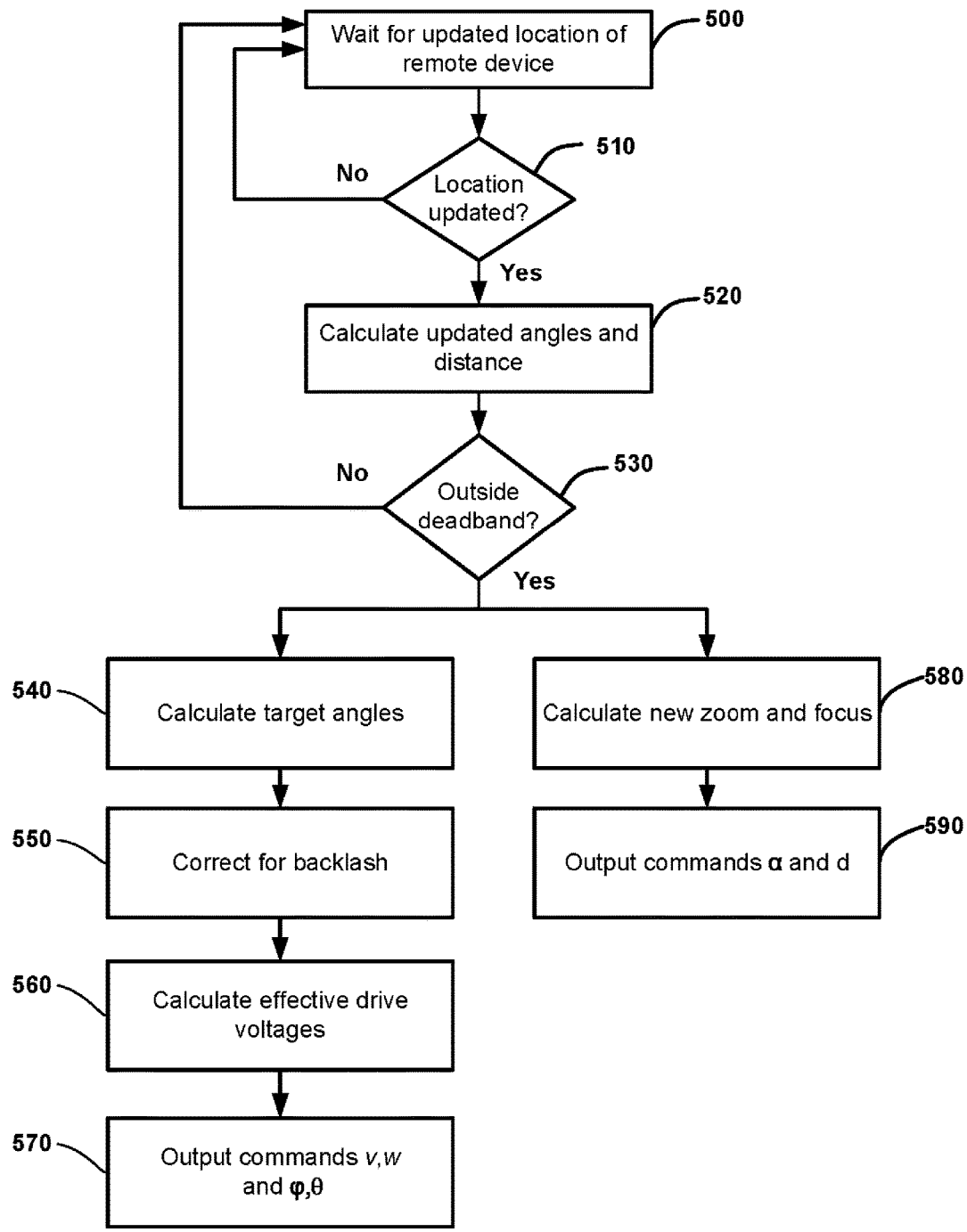
FIG. 14 shows a flowchart illustrating a method of operating an automatic video recording system with zoom and focus control according to a preferred embodiment of the present invention.

FIG. 14 is a flowchart illustrating a method of operating an automatic video recording system with zoom and focus control according to a preferred embodiment of the present invention. Location determination technology generates location data of remote device 16 periodically several times each second. Base station 18 stores data about the current location and orientation of camera 46. A communication link between base station 18 and remote device 16 is present. During the continuing operation of the automatic video recording system an updated location of remote device 16 (i.e., the target of the recording) is expected. Base station 18 of automatic video recording system 10 waits to receive an updated location of remote device 16 from the location determination technology used (step 500). When an updated location is received in step 510, updated values for the pan and tilt pointing angles and the distance between camera 46 and remote device 16 are determined in step 520. A deadband is preferably set meaning that the camera orientation and zoom will not be changed unless the change in the orientation and/or length of pointing vector 48 is outside of certain preset limits. A determination of whether the updated angles and distance of step 520 is outside of the deadband is performed in step 530. If the new location coordinates indicate that subject 12 has substantially moved (i.e., moved outside of the deadband), several events will occur. Target pointing angles are calculated in step 540. The target pointing angles are pan and tilt angles to which camera 46 will be moved based on the latest information received from the location determination technology. The target pointing angles are not the angles of the current camera orientation but rather the angles to which camera 46 would be turned if current movement of the subject 12 continues without change. The target pointing angles are modified by backlash compensation in step 550. For further details, reference is hereby made to the '803 Patent Application incorporated by referenced above. Effective drive voltages (for causing pan and tilt movements) are calculated in step 560. Commands based on the effective voltages are output in step 570. These voltages regulate both the pan and tilt turning angles, denoted by φ and θ, and the pan and tilt turning velocities, denoted by v and w, respectively. Simultaneously, zoom and focus are calculated for the new position of subject 12 in step 580. Commands for the new zoom angle α and new focal distance d are generated in step 590. The commands for the turning angle and turning velocity are outputs for positioner 32; the commands for zoom and focus are outputs for camera 46. The process of FIG. 14 is repeated every time a location update is generated in the remote device 16.

If step 500 takes too long, the output commands reorient and refocus camera 46 to the last detected position of subject 12. Here "too long" may be defined, for example, as missing two consecutive updates. Using this example, "too long" could be about 500 milliseconds if the normal updating frequency is about five Hz. Base station 18 may be programmed to command camera 46 to zoom out until an update from location determination technology is received again. In step 520, the updated location coordinates of remote device 16 are recalculated in terms of angular orientation of the camera and in step 530 the difference of the updated and previous orientations is compared to a deadband in order to decide whether the change in the orientation warrants camera movement. As an example, if the angular change is less than about one degree, the camera does not move. This feature prevents unnecessary small movements. For example, if the subject is a speed skater and the remote device is attached to his arm, left-right arm swings would occur nearly every second. It would be very unpleasant to watch a video following these swings. If the subject moves outside of the deadband, a target camera angle is calculated in step 540; the angle calculated in step 520 is one input for the calculation in step 540.

At velocities that exceed a set limit, it is expected that the camera movement may lag substantially behind subject 12 and based on the last two or three or more angular positions a subsequent position may be predicted. This can be done using linear extrapolation from two data points, using least square fit linear extrapolation from more than two points, or using quadratic fit to at least three points, etc.; the result is a target angle. After software corrects for backlash in step 550, effective driving voltages are computed in step 560. Proportional-integral-derivative methods may be applied in this step. In a preferred embodiment, the effective driving voltage depends on the difference between the target angle and current camera orientation, such that if the difference is large, the angular velocity of the camera movement is larger as well.

In a preferred embodiment, after the location update is received, the driving voltage is higher (and the camera movement is faster) if the angular change is greater and even faster if the camera orientation has been already lagging. The voltage is calculated as V=K*(target angle−camera angle), where K is a proportionality constant. V is updated frequently, for example, even if the target angle is updated at about five Hz, V may be updated at about 200 Hz; the frequency of this updating depends on the frequency with which base station 18 receives updates from positioner 32 regarding the actual angular position of the camera 46. In the preferred embodiment of automatic video recording system 10, positioner 32 comprises one or more encoded wheel systems that generate the information regarding the actual angular position at any given moment.

If camera 46 gets close to the target angle, its movement slows down to avoid overshooting. In one preferred embodiment, the deadband is preferably recalculated when the subject moves past its boundary. Preferably, the deadband should move slower than the subject so that even moderate movement of the subject 12 in the direction of previous movement does move camera 46 but similar movement of the subject 12 in the reverse direction does not. This approach reduces unnecessary camera movements (i.e., the jitteriness of the recording) to a significant extent.

As an alternative to proportional-integral-derivative control, pulse width modulation may be applied either alone or in combination with adjusting the voltage. Other control approaches may be employed in different embodiments of the present invention depending on the type of motors used in positioner 32 to orient camera 46. For example, velocities of stepper motors may be controlled by adjusting the time interval between step or microstep commands. Open loop control, which eliminates the need for feedback such as from an encoded wheel, may be used by keeping track of step count and direction.

In step 550, the target angle is modified based on the known or estimated backlash of the driving motor and gearbox. In step 570, the effective voltage and target angle are output to the positioner as there are two command parameters regulating a motor (for example, a pan drive). In embodiments where multiple drives are used, each drive receives commands that result from similar processing.

In addition, in step 590, base station 18 sends drive signals directly to the camera so that the focus and zoom, and therefore the field of view, are adjusted depending on the distance between camera 46 and subject 12. Zoom is also adjusted depending on the velocity of the subject 12. At high velocities the automatic video recording system may not be able to keep the subject within the frame unless camera 46 zooms out (i.e., the frame is enlarged). The reason for this is related to the lag of camera positioning movement with respect to the movements of the subject 12 and also due to the deadband. In a constant velocity situation, where the effect of the deadband may be discounted, the lag is due mainly to the time delay (latency) of the LDT. Other factors that may cause delay include the finite updating frequency of the location determination technology, the finite processing speed of the electronics in base station 18, and the limited torque of the motors of the positioner 32 combined with the inertia of camera 46. For example, using the values of the example above, assuming that the camera zoom angle is α=5.7 degrees, the distance between subject 12 and camera 46 is 400 feet, resulting in a frame width of 40 ft. If one assumes that the lag time is 0.6 seconds and that the subject 12 moves with a velocity of 40 feet per second (about 27 mph), in 0.6 seconds the subject 12 will move about 26 feet off center of the frame, meaning that the subject has moved outside the frame before LDT updates the subject's location. To avoid this situation, the zoom must be adjusted before the subject 12 goes off screen, i.e., when his/her speed is, for example, 20 feet per second and accelerating. The higher the lag time, the velocity, and the expected velocity, the wider camera angle α is chosen to keep recording the subject 12.

In applications where the lag of camera movement is significant, it may be counteracted by estimating the anticipated position of the target based on past location, velocity, and acceleration information and by instructing the positioner to move to an anticipated target angle. A process predicts "next" positions of subject 12 based on recent past location, velocity, and acceleration values using methods known to those having skill in the art. The angular velocity of positioning camera 46 is proportional to the size of the angle between a current position and "next" position of the subject 12. Using predicted "next" positions provides for faster camera movement when necessary.

The process used by base station 18 estimates or predicts the magnitude of possible orientation error due to lag time and due to the uncertainty of LDT. Base station 18 is programmed to send a signal to camera 46 to adjust the zoom such that the field of view is sufficiently wide. In practice, the lag time may be as much as one second. Preferably, the camera should zoom out such that the movement of subject 12 during the lag time does not take the subject out of the FOV.

Another reason for zoom adjustment may be that the location of the subject is temporarily unavailable or has been missing for a period of time. Such missing data points may be due to a variety of causes. For example, in the case of LDT based on Global Positioning System, single data points may be missing due to various short term problems in satellite-to-antenna communication. Longer missing data sequences may be due, for example in a surfing application, to the subject being submerged in water. The process used by base station 18 is preferably designed to ignore single missing data points and to command camera 46 to zoom out when data is missing for multiple cycles. When the signal reappears, the subject 12 will likely be within the frame even if he or she has moved some considerable distance.

If there is no reason to zoom out, base station 18 sends a command to camera 46 to return to the zoomed-in state to produce recording with as high a resolution as feasible.

In a preferred embodiment, automatic video recording system 10 comprises a single positioner 32 and single camera 46 capable tracking multiple remote devices 16. For example, at a sporting event multiple subjects 12 may be within the view of camera 46. The base station 18 computes an optimal direction for the camera, combined with appropriate zoom and focus based on the locations of multiple remote devices 16 to ensure that multiple subjects 12 appear within the field of view of camera 46. In one preferred embodiment, commands are directed to orienting camera 46 and adjusting its zoom and focus to capture all subjects 12 in its FOV, if possible, and to select some subjects for recording if recording all subjects is not possible. In a preferred embodiment, automatic video recording system 10 provides feedback to the multiple subjects being recorded so that they may know when they are in the FOV or being recorded by camera 46.

In the embodiment where multiple subjects 12 are recorded with a single camera 46 and all subjects 12 cannot appear in the view at the same time, a selection of a set of subjects must be made. The selected subject or subjects may be determined by a plurality of alternative methods. For example, the system maximizes the number of subjects able to be captured in the field of view at a preset minimum zoom; or the system tracks subjects in a preset hierarchy; a primary subject is tracked but when additional subjects are in the vicinity of the primary subject, the system adjusts orientation and/or zoom of the camera to capture the primary subject and nearby secondary subject or subjects.

Figure 15:
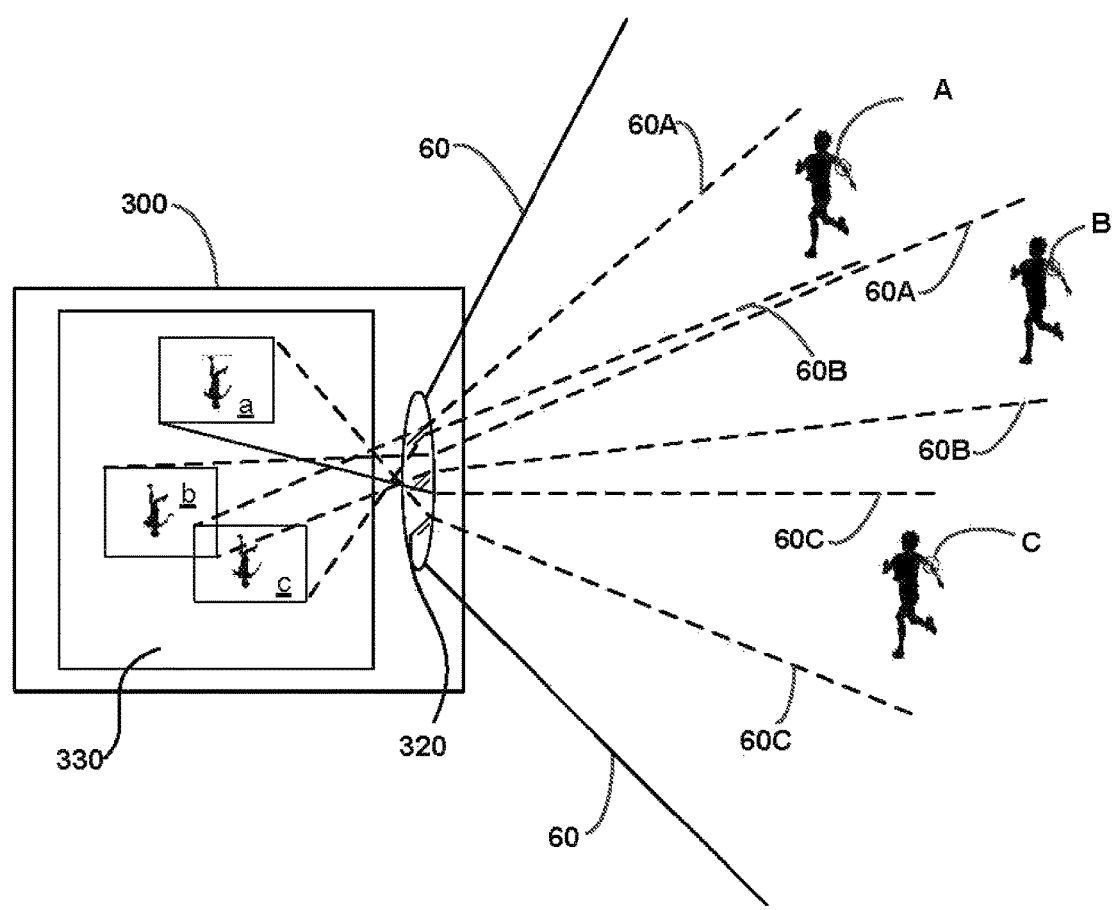
FIG. 15 shows a schematic diagram of yet another preferred embodiment of the present invention.

FIG. 15 shows yet another preferred embodiment of the invention. In the embodiment of FIG. 15, image capturing device 300 is equipped with a very high resolution image sensor 330. Image capturing device 300 is operated using wide angle optics 320 that has a sufficiently wide FOV to capture the desired subject's movements without changing its orientation. The FOV is shown in FIG. 15 by lines 60. With the location and orientation of camera 300 known and the location of subject A determined using LDT, the system can crop the full video to the area just surrounding and including subject A to give the appearance in the cropped video that a zoomed camera was following subject A. This is made possible by selecting the pixels within the area a of image sensor 330. The apparent FOV of the selected pixels of image sensor 330 are shown in FIG. 12 using broken lines 60A. An example of this embodiment employs a high resolution stationary camera facing a snow ski run, such that the view field of the camera encompasses the majority of the run. When a skier with a remote device 16 (see FIG. 5) skis within the FOV of camera 300, the software digitally crops the full video and outputs a video file that contains a "zoomed-in" view of the skier as he or she skis down the mountain. Multiple subjects A, B and C may each carry their own remote devices 16 and the system can separately put out videos of each individual subject A, B, and C using corresponding areas a, b and c of the image sensor. The system keeps track of which video sections are associated with which specific remote device 16. Such a system would be useful to a resort or sporting organization despite the extra expense of the high resolution image sensor and the required data storage and software capabilities. For example, at the end of a day of skiing, each user may collect a DVD or other media storage device with the cropped videos of their skiing that day. Alternatively, the videos may be uploaded to a server where each user may access their specific cropped video files. Because this described embodiment records one wide angle shot and digitally crops sections of it based on the locations of the subjects within the view area, it is capable of producing cropped video recordings of multiple users who are simultaneously in different portions of the view area. If multiple skiers carrying remote devices 16 simultaneously ski through different portions of the view area of camera 300, the system separately crops and stores the cropped video file of each user. In this embodiment, cropping the video is performed post real time. By delaying the digital cropping process, the full path of each subject is known prior to cropping the video. By synchronizing timestamps of the subject's location data and the timestamps on the captured video, and by accounting for the lag time in the data collection, an accurate determination of the target's location within the camera FOV can be determined and the video can be cropped appropriately.

Upon reading the teachings of this specification, it is important to recognize that many components that are usually thought of as components of a camera (including video recording device) may not be built in the cameras of the future and that future cameras may be built such that they are incorporated in apparatuses that implement other functions than narrowly defined video recording, such additional functions may include, for example, editing video clips or uploading such clips to Internet servers.

Figure 16:
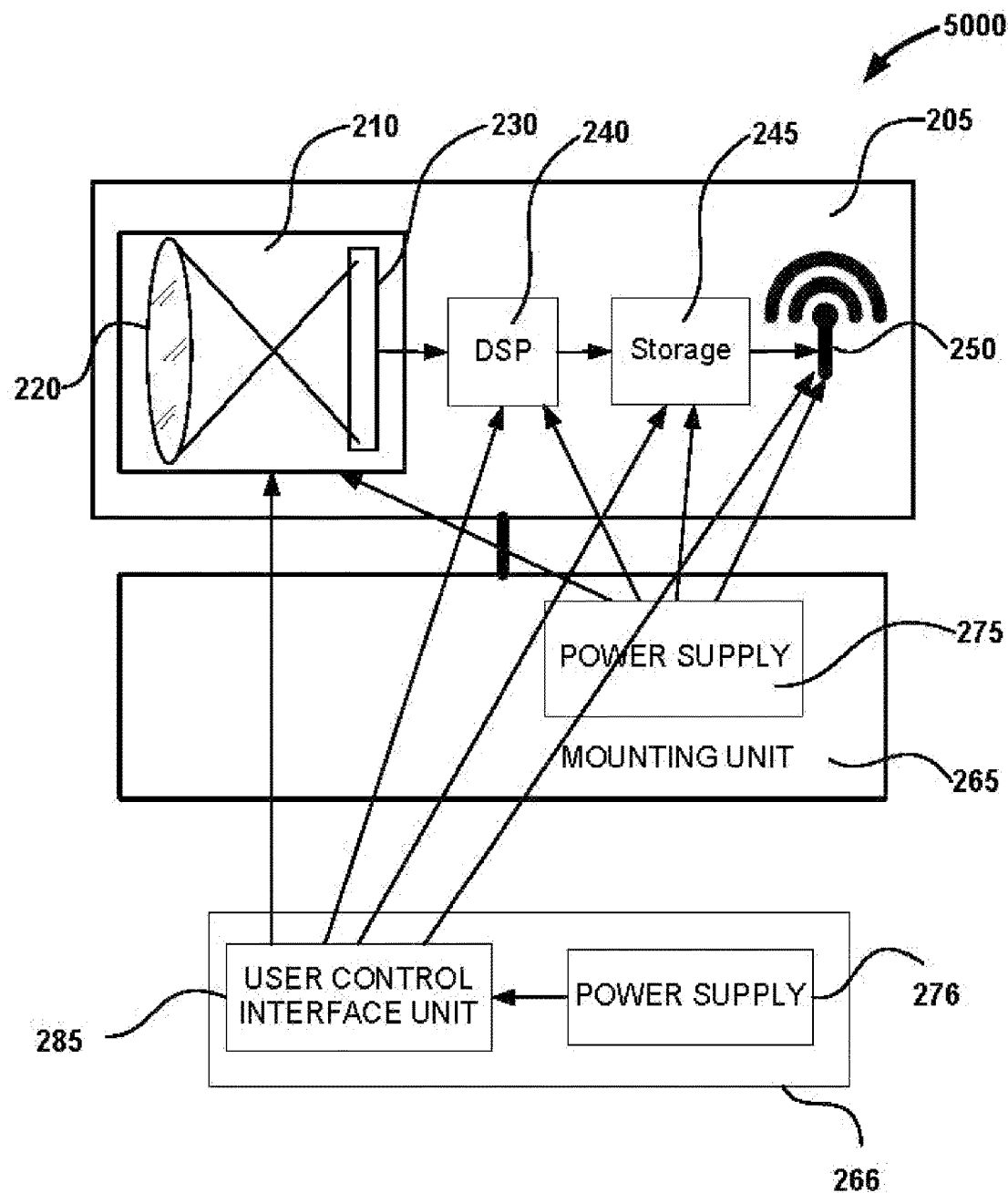
FIG. 16 shows a schematic diagram of the major components of another embodiment of the inventive image capturing system.

FIG. 16 shows a schematic diagram of the major components of yet another embodiment of the inventive image capturing system. FIG. 16 illustrates an assembly of modular components forming image capturing device 5000. In the embodiment shown in FIG. 16, user control interface unit 285 and power supply 276 are separate from mounting unit 265, as shown. Mounting unit 265, is different from mounting unit 260 shown in FIGS. 1-3 in that it is no longer a passive device for mechanical support only. Those with skill in the art will now appreciate that user control interface unit 285, having been separated from power supply 275 requires a power supply of its own, which is shown as power supply 276. Units 285 and 276 may be separate or may be integrated into unit 266 which may, for example, be attached to the chest of user 600. Since existence of unit 266 is optional, it is shown using dashed lines in FIG. 16.

Figure 17:
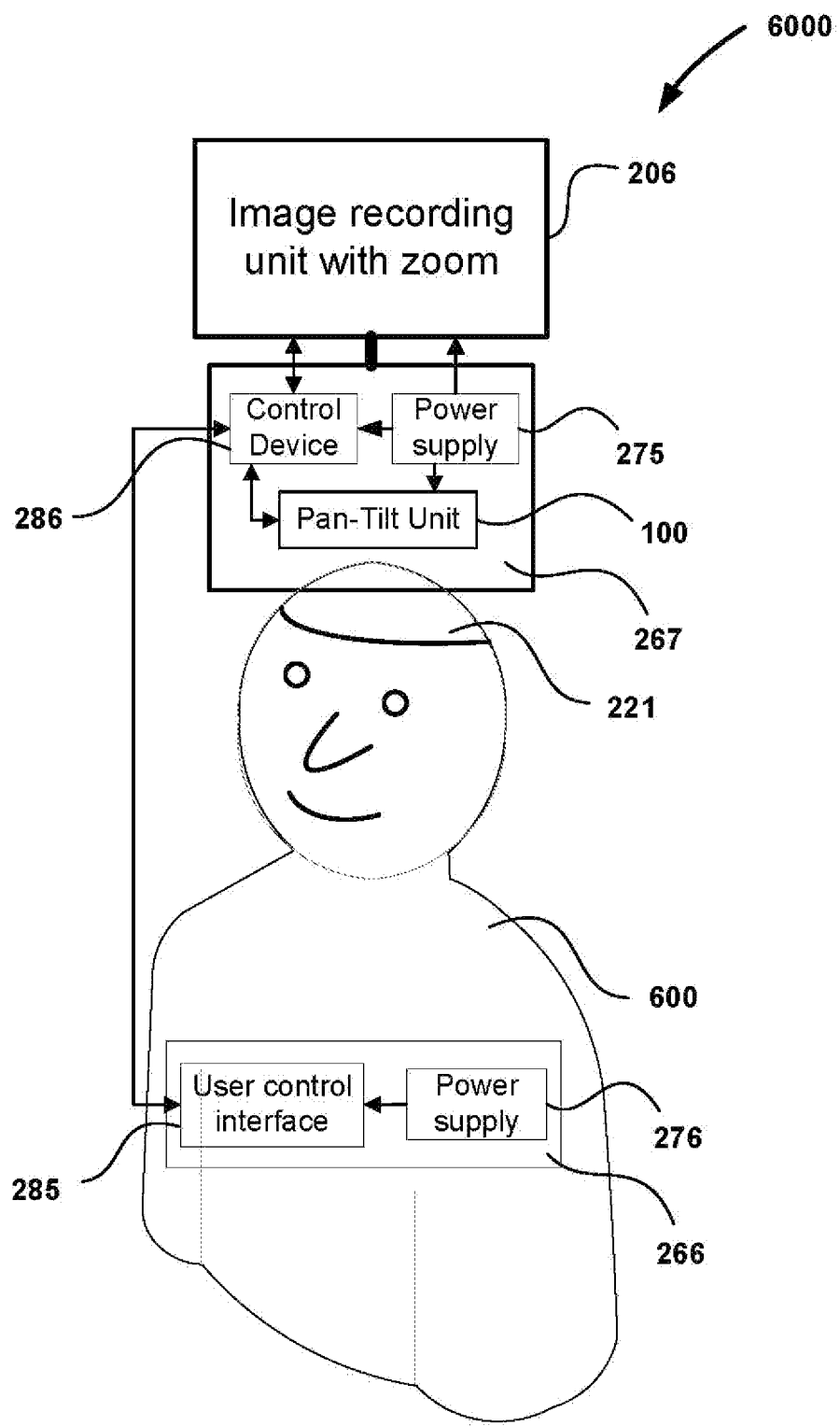
FIG. 17 shows a schematic diagram of the major components of still another embodiment of the inventive image capturing system.

FIG. 17 shows a schematic diagram of the major components of still another embodiment of the inventive image capturing system. FIG. 17 illustrates an assembly of modular components forming image capturing device 6000 assembled in part on helmet 221 of user 600. In the embodiment shown in FIG. 16, user control interface unit 285 and power supply 276 are separate from mounting unit 267, as shown. Mounting unit 267, is different from mounting unit 260 shown in FIGS. 1-3 in that it is no longer a passive device for mechanical support only. Those with skill in the art will now appreciate that user control interface unit 285, having been separated from power supply 275 requires a power supply of its own, which is shown as power supply 276. Units 285 and 276 may be separate or may be integrated into unit 266 which may be attached to the chest of user 600, as shown. Since existence of unit 266 is optional, it is shown using dashed lines in FIG. 17. Image recording unit 206 may be a digital camera (at least embodying herein a digital camera module) according to a preferred embodiment of the present invention. Image recording unit 206 preferably has a zoom function. Pan-tilt unit 100 turns image recording unit 206 to follow a tag (not shown) in response to commands of control device 286. In the embodiment shown in FIG. 17, image capturing device 6000 is controlled by user 600 who enters commands into user control unit 285, which in turn relates these commands to control device 286 and to image recording unit 206. The commands may be transmitted using wired or wireless connections. The user receives status information via user control interface 285. In FIG. 17, user control interface unit 285 communicates user input to control device 286, as shown. According to a preferred embodiment hereof, user control interface unit 285 does not directly control image recording unit 206 (the digital camera module) and pan-tilt unit 100 (at least embodying herein an orienting device); the direct control is carried out by control device 286, as shown.

According to a preferred embodiment hereof, image recording unit 206 may also comprises use controls. According to another preferred embodiment hereof, image recording unit 206, pan-tilt unit 100, and power supply 275, may be integrated in a common housing. According to another preferred embodiment hereof, image recording unit 206, pan-tilt unit 100, orienting device, power supply 275, and power supply module, and control device 286 may be integrated in a common housing. According to another preferred embodiment hereof, image recording unit 206, pan-tilt unit 100, and power supply 275 are integrated in a common housing with control device 286 and user control interface unit 285 housed individually. According to another preferred embodiment hereof, control device 286 may control a plurality of image capturing devices or automatic video recording systems. According to another preferred embodiment hereof, image recording unit 206, pan-tilt unit 100, and power supply 275 are housed or integrated in a common housing, and control device 286 and user control interface unit 285 are housed separately in a common housing.

Different preferred embodiments, methods, applications, advantages, and features of this invention have been described above; however, these particular embodiments, methods, applications, advantages, and features should not be construed as being the only ones that constitute the practice of the invention. Indeed, it is understood that the broadest scope of this invention includes modifications. Further, many other applications and advantages of applicant's invention will be apparent to those skilled in the art from the above descriptions and the below claims.

What is claimed is:

1. An image capturing device for recording images of a subject or by a subject, comprising: an imaging unit, said imaging unit comprising optics, an image sensor, an image processor, and a storage device; said image capturing device further comprising a mounting support unit wherein said mounting support unit supports and orients said imaging unit but wherein said mounting support unit is housed separately from said imaging unit; a user control interface unit wherein said user control interface unit is connected to said imaging unit and controls said imaging unit but is housed separately from said imaging unit; one or more power supply units wherein at least one power supply unit provides power to said imaging unit but is housed separately from said imaging unit; and wherein at least one of said mounting support unit, said user control interface unit, and said power supply units are co-located with the subject when said image capturing device is used to record images; and said mounting support unit, user control interface unit, and power supply unit are housed together in a common housing.

2. The image capturing device of claim 1, wherein said mounting support unit is co-located with the subject when said image capturing device is used to record images.

3. The image capturing device of claim 1, wherein said optics comprises a fisheye lens.

4. The image capturing device of claim 1, wherein said optics comprises a focusable lens system.

5. An automatic video recording system comprising:
a digital camera module,
an orienting device,
a first power supply module,
a second power supply module,
a control device, and
a user interface;
wherein said digital camera module and said orienting device receive power from said first power supply module;
wherein said control device controls said digital camera module and said orienting device;
wherein said orienting device orients said digital camera module;
wherein said digital camera module also comprises user controls; and
wherein said user interface communicates user input to said control device but does not directly control said digital camera module and said orienting device, and wherein said user interface is powered by said second power supply module.

6. A method of providing a user with image-capturing and related components wherein the components are selected and arranged by a user to record a variety of activities, said method comprising:
  providing modular units that may be assembled in a variety of ways into an image capturing device, wherein each of said modular units, may have multiple variants, wherein said variants have common functions as modular units of said image capturing device, said modular units comprising
    a) a first modular component comprising an imaging unit, said imaging unit comprising optics, an image sensor, an image processor, and a data storage device having a storage capacity to store images captured by said image sensor and processed by said image processor;
    b) a second modular component comprising a mounting support that mechanically engages the image capturing device to support and orient the image capturing device;
    c) a third modular component, housed separately from said image capturing device and from all other modular components, comprising a user interface control unit and a power supply wherein the user interface control unit and power supply of the second modular component are in a common housing;
    d) a fourth modular component, housed separately from said image capturing device and from all other modular components, comprising a user interface control unit;
    e) a fifth modular component, housed separately from said image capturing device and from all other modular components, comprising at least one power supply; and
    f) a sixth modular component, housed separately from said image capturing device and from all other modular components, comprising a mounting support, a user control interface, and a power supply in a common housing;
  permitting a user to select, based on the user-desired activity to be recorded, from said modular components to interface with said imaging unit to provide user-desired optics, user control, mounting, and power suitable for the activity to be recorded.

7. The method according to claim 6 wherein additional modular power supply components are provided.

8. The method according to claim 6 wherein the capacity of the storage device may be selected according to the activity to be recorded.

9. The method according to claim 6, wherein the size of the power supply may be selected according to the activity to be recorded.

10. The method according to claim 6, wherein said imaging unit is mountable on the user.

11. An image capturing device for recording images of a subject or by a subject, comprising: an imaging unit, said imaging unit comprising optics, an image sensor, an image processor, and a storage device; said image capturing device further comprising a mounting support unit wherein said mounting support unit supports and orients said imaging unit but wherein said mounting support unit is housed separately from said imaging unit; a user control interface unit wherein said user control interface unit is connected to said imaging unit and controls said imaging unit but is housed separately from said imaging unit; one or more power supply units wherein at least one power supply unit provides power to said imaging unit but is housed separately from said imaging unit; and wherein at least one of said mounting support unit, said user control interface unit, and said power supply units are co-located with the subject when said image capturing device is used to record images; and said mounting support unit and at least one power supply unit are housed together in a common housing and are co-located with the subject when said image capturing device is used to record images, and said user control interface unit is also co-located with the subject, when said image capturing device is used to record images, but is housed separately from said common housing comprising said mounting support unit and said at least one power supply unit.

12. The image capturing device of claim 11, wherein said optics comprises a fisheye lens.

13. The image capturing device of claim 11, wherein said optics comprises a focusable lens system.

14. An image capturing device for recording images of a subject or by a subject, comprising: an imaging unit, said imaging unit comprising optics, an image sensor, an image processor, and a storage device; said image capturing device further comprising a mounting support unit wherein said mounting support unit supports and orients said imaging unit but wherein said mounting support unit is housed separately from said imaging unit; a user control interface unit wherein said user control interface unit is connected to said imaging unit and controls said imaging unit but is housed separately from said imaging unit; one or more power supply units wherein at least one power supply unit provides power to said imaging unit but is housed separately from said imaging unit; and wherein at least one of said mounting support unit, said user control interface unit, and said power supply units are co-located with the subject when said image capturing device is used to record images; and said mounting support unit is capable of automatically orienting said imaging unit at the subject and wherein the subject is co-located with said user control interface unit, when said image capturing device is used to record images.

15. The image capturing device of claim 14, wherein said optics comprises a fisheye lens.

16. The image capturing device of claim 14, wherein said optics comprises a focusable lens system.

17. An automatic video recording system comprising:
  a digital camera module,
  an orienting device,
  a first power supply module,
  a second power supply module,
  a control device, and
  a user interface;
  wherein said digital camera module and said orienting device receive power from said first power supply module;
  wherein said control device controls said digital camera module and said orienting device;
  wherein said orienting device orients said digital camera module;
  wherein said user interface communicates user input to said control device but does not directly control said digital camera module and said orienting device, and wherein said user interface is powered by said second power supply module; and
  wherein said digital camera module, said orienting device, said first power supply module, and said control device are housed in a common housing.

18. An automatic video recording system comprising:
a digital camera module,
an orienting device,
a first power supply module,
a second power supply module,
a control device, and
a user interface;
wherein said digital camera module and said orienting device receive power from said first power supply module;
wherein said control device controls said digital camera module and said orienting device;
wherein said orienting device orients said digital camera module;
wherein said user interface communicates user input to said control device but does not directly control said digital camera module and said orienting device, and wherein said user interface is powered by said second power supply module; and
wherein said digital camera module, said orienting device, and said first power supply module are housed in a common housing and wherein each said control device and said user interface are housed individually.

19. The automatic video recording system of claim 18, wherein said control device controls a plurality of automatic video recording systems.

20. An automatic video recording system comprising:
a digital camera module,
an orienting device,
a first power supply module,
a second power supply module,
a control device, and
a user interface;
wherein said digital camera module and said orienting device receive power from said first power supply module;
wherein said control device controls said digital camera module and said orienting device;
wherein said orienting device orients said digital camera module;
wherein said user interface communicates user input to said control device but does not directly control said digital camera module and said orienting device, and wherein said user interface is powered by said second power supply module; and
wherein said digital camera module, said orienting device, and said first power supply module are housed in a common housing and wherein said control device and said user interface are housed separately in a common housing.

* * * * *